United States Patent [19]
Terado et al.

[11] Patent Number: 6,140,458
[45] Date of Patent: Oct. 31, 2000

[54] PREPARATION PROCESS OF POLYESTER

[75] Inventors: Yuji Terado; Hiroshi Suizu; Masatoshi Takagi; Masanobu Ajioka, all of Kanagawa-ken; Shoji Hiraoka, Yamaguchi-ken; Masayuki Sakai, Hiroshima-ken; Hiroyuki Suzuki, Kanagawa-ken; Ryo Shinagawa, Kanagawa-ken; Shinji Ogawa, Kanagawa-ken; Yasushi Kotaki, Tokyo-to, all of Japan

[73] Assignee: Mitsui Chemicals, Inc., Japan

[21] Appl. No.: 09/300,292

[22] Filed: Apr. 27, 1999

[30] Foreign Application Priority Data

Apr. 28, 1998 [JP] Japan .................................. 10-119581
Oct. 6, 1998 [JP] Japan .................................. 10-284291
Dec. 25, 1998 [JP] Japan .................................. 10-369536
Feb. 17, 1999 [JP] Japan .................................. 11-038290

[51] Int. Cl.$^7$ .............................. C08G 63/06; C08K 5/41
[52] U.S. Cl. ......................... 528/272; 528/274; 528/283; 528/491; 528/492; 528/499; 528/503; 524/745; 524/784
[58] Field of Search ................................... 528/272, 274, 528/283, 361, 491, 492, 499, 503; 524/745, 784

[56] References Cited

U.S. PATENT DOCUMENTS 4,057,537  11/1977  Sinclair .

FOREIGN PATENT DOCUMENTS 0261572  3/1988  European Pat. Off. .
0500098  8/1992  European Pat. Off. .
3641692  6/1988  Germany .

*Primary Examiner*—Samuel A. Acquah
*Attorney, Agent, or Firm*—Burns, Doane, Swecker & Mathis, L.L.P.

[57] ABSTRACT

The invention provides a process for producing high-molecular aliphatic polyesters capable of being substitutes for general-purpose resins that are required to have high toughness, in a simplified manner and at a high volume efficiency. Specifically, in the process, used as the starting material is an easily-available, low-molecular aliphatic polyester prepolymer to be prepared through polycondensation of inexpensive materials of an aliphatic hydroxycarboxylic acid such as lactic acid, glycolic acid or the like, an aliphatic polyalcohol such as butanediol or the like, and an aliphatic polycarboxylic acid such as succinic acid or the like, and the starting prepolymer is crystallized and thereafter polycondensed in a solid phase in the presence of a catalyst to give the intended, tough and high-molecular aliphatic polyester.

32 Claims, No Drawings

PREPARATION PROCESS OF POLYESTER

BACKGROUND OF THE INVENTION

1. Field of the Invention

The present invention relates to a process for producing aliphatic polyesters having at least 50% of aliphatic hydroxycarboxylic acid units, which are biodegradable polymers usable as medical materials and as substitutes for general-purpose resins.

More precisely, the invention relates to a process for producing high-molecular aliphatic polyesters having at least 50% of aliphatic hydroxycarboxylic acid units, which comprises solid-phase polymerization of a crystallized, low-molecular aliphatic polyester prepolymer having at least 50% of aliphatic hydroxycarboxylic acid units in the presence of a catalyst.

The invention includes a process for preparing high-molecular aliphatic polyesters with the amount of the catalyst remaining therein being reduced, which comprises, for example, polymerizing an aliphatic hydroxycarboxylic acid in the presence or absence of a specific volatile catalyst and in the presence or absence of a solvent to give an aliphatic hydroxycarboxylic acid prepolymer having a relatively low molecular weight, then effectively crystallizing the resulting aliphatic hydroxycarboxylic acid prepolymer, and thereafter polymerizing it in a solid phase in the presence of a specific volatile catalyst at a temperature not higher than the melting point of the prepolymer.

2. Description of the Related Art

Associated with the protection of the environment, waste disposal is a problem in these days. In particular, wastes of general-purpose polymer moldings and processed goods are not biodegradable and are therefore problematic in that, when buried for land reclamation, they will remain semi-permanently in the land as impurities, because they are lacking in ability to degrade or disintegrate by the action of microorganisms. And, in addition, additives such as plasticizer and others will be released out from them to pollute the environment.

Further, when the wastes are incinerated, the combustion heat from them is high and will damage furnaces. In addition, the waste incineration brings about other serious problems in that the exhaust fumes and gas will cause air pollution, ozone layer destruction, global warming, acid rain, etc.

In that situation, there is increasing a great demand for polymer materials which are tough enough for general-purpose applications and of which the wastes are, when buried for land reclamation, degradable to be harmless, and, even when incinerated, produce low-temperature combustion heat that will not damage furnaces. At present, however, satisfactory polymer materials that could satisfy the demand are not available.

Polylactic acid which is one of aliphatic polyhydroxycarboxylic acids is highly transparent and tough and is characterized in that it is easily hydrolyzed in the presence of water. Therefore, when used as a general-purpose resin, it is gentle to the environment, since its wastes are easily degraded to be harmless, not polluting the environment. When used as a medical material to be left in bodies, it is degraded and absorbed in bodies, after having accomplished its object, and is therefore not toxic to bodies but is gentle thereto. The excellent properties of polylactic acid have already been noticed prior to the present application.

It has heretofore been known that high-molecular aliphatic polyhydroxycarboxylic acids are prepared, for example, according to a method of ring-opening polymerization of cyclic dimers of aliphatic hydroxycarboxylic acids, such as glycolides, lactides and others, or a method of direct dehydrating polycondensation of aliphatic hydroxycarboxylic acids such as lactic acid, glycolic acid and others (see U.S. Pat. No. 5,310,865). The ring-opening polymerization of cyclic dimers of aliphatic hydroxycarboxylic acids is generally carried out while the dimers are melted; and the direct dehydrating polycondensation of aliphatic hydroxycarboxylic acids is generally carried out in an organic solvent. The ring-opening polymerization method requires expensive lactides and the like that shall be prepared in a complicated process; and the direct dehydrating polycondensation method must be conducted in an organic solvent and the volume efficiency of the reaction therein is low.

JP-A 5-255488 (EP-A-500098) discloses a technique of heating a powdery or granular, low-molecular homopolymer or copolymer of L- and/or D-lactic acid having a degree of crystallinity as measured through X-ray diffractometry of at least 10%, in vacuum and/or in an inert gas atmosphere at a temperature higher than the glass transition temperature of the polymer but lower than the melting point thereof to thereby increase the molecular weight of the polymer. The invention disclosed in that JP-A or EP-A is characterized in that the polymerization is carried out in the absence of a catalyst to give a polymer with no catalyst residue. They say that the polymer produced therein is highly safe and is important for the technique of controlled release of medicines in bodies and for the production of bioabsorbable artificial organs.

However, as not employing a catalyst, high-molecular polymers capable of being substitutes for general-purpose resins that are required to have high toughness could not be produced in the disclosed invention.

SUMMARY OF THE INVENTION

Given the current situation, therefore, one object of the present invention is to provide a process for producing high-molecular aliphatic polyesters capable of being substitutes for general-purpose resins that are required to have high toughness, in a simplified manner and at a high volume efficiency. Specifically, in the process, used as the starting material is an easily-available, low-molecular aliphatic polyester prepolymer to be prepared through polycondensation of inexpensive materials of an aliphatic hydroxycarboxylic acid such as lactic acid, glycolic acid or the like, an aliphatic polyol such as 1,4-butanediol or the like, and an aliphatic polycarboxylic acid such as succinic acid or the like, and the starting prepolymer is crystallized and thereafter polycondensed in a solid phase in the presence of a catalyst to give the intended, tough and high-molecular polyester.

Another object of the invention is to provide a process for producing high-molecular aliphatic polyesters, in which is used a specific catalyst for polycondensation, and the catalyst is removed during the reaction so as to reduce the catalyst residue remaining in the final products of polyesters. The aliphatic polyesters thus produced in the process are safe, comparable to those to be produced through non-catalyst reaction.

Still another object of the invention is to provide a process for producing high-molecular aliphatic polyesters that are little colored. The process is characterized by specific crystallization of a low-molecular aliphatic polyester prepolymer, in which the crystallization of the prepolymer is easy without bringing about any problem of fusion, breakage or powdering of the prepolymer, and facilitates the next step of polycondensation of the crystallized prepolymer.

Still another object of the invention is to provide a process for producing high-molecular aliphatic polyesters having a high optical purity. In the process where an aliphatic hydroxycarboxylic acid having an asymmetric carbon atom is used as one starting material, a prepolymer having a high optical purity is prepared through polycondensation to be carried under a specific condition, and this is subjected to solid-phase polymerization into the intended aliphatic polyester. The aliphatic polyesters having a high optical purity can be molded within a shortened period of time, and have excellent moldability and workability.

Specifically, the present invention is characterized by the following matters [1] to [25]:

[1] A process for producing aliphatic polyesters having a weight-average molecular weight ($Mw_2$) that falls within a numerical range as defined by the following numerical formula (2) and numerical formula (3) and having at least 50% of aliphatic hydroxycarboxylic acid units, which comprises polymerizing a crystallized, aliphatic polyester prepolymer having a weight-average molecular weight ($Mw_1$) that falls within a numerical range as defined by the following numerical formula (1) and having at least 50% of aliphatic hydroxycarboxylic acid units, in a solid phase in the presence of a catalyst:

$$2 \times 10^3 \leq Mw_1 \leq 1 \times 10^5 \quad (1),$$

$$5 \times 10^4 \leq Mw_2 \leq 1 \times 10^6 \quad (2),$$

$$Mw_1 < Mw_2 \quad (3).$$

[2] The process for producing aliphatic polyesters of [1], wherein the crystallized, aliphatic polyester prepolymer is one as prepared by crystallizing a solid, aliphatic polyester prepolymer through contact with a liquid not dissolving said prepolymer.

[3] The process for producing aliphatic polyesters of [1], wherein the crystallized, aliphatic polyester prepolymer is one as prepared by solidifying and crystallizing a molten, aliphatic polyester prepolymer through contact with a liquid not dissolving said prepolymer.

[4] The process for producing aliphatic polyesters of [1], wherein the crystallized, aliphatic polyester prepolymer is one as prepared by solidifying and crystallizing a solution of an aliphatic polyester prepolymer as dissolved in a solvent, through contact with a liquid not dissolving said prepolymer.

[5] The process for producing aliphatic polyesters of any one of [2] to [4], wherein the liquid contains water at least partially.

[6] The process for producing aliphatic polyesters of [1], wherein the catalyst is a volatile catalyst.

[7] The process for producing aliphatic polyesters of [1], wherein the catalyst is a volatile catalyst, and the residual percentage of the catalyst, R, in the product, which is defined by the following numerical formula (10), is at most 50%:

$$R[\%] = C_A[\text{ppm}] \div C_B[\text{ppm}] \times 100 \quad (10)$$

wherein R is the residual percentage of the catalyst [%], and this constitutes an index of the variation in the catalyst concentration before and after the solid-phase polymerization, $C_B$ [ppm] is the theoretical catalyst concentration in the case where all the catalyst as fed into the reaction system for solid-phase polymerization is to remain in the product, aliphatic polyester, and this is represented by the following numerical formula (11), and $C_A$ [ppm] is the actual catalyst concentration in the aliphatic polyester as finally obtained after the solid-phase polymerization, and this is represented by the following numerical formula (12):

$$C_B[\text{ppm}] = W_B[g] \div W_P[g] \times 10^6 \quad (11)$$

wherein $W_B$ [g] is the total weight of the catalyst as fed into the reaction system during the solid-phase polymerization, and $W_P$ [g] is the weight of the aliphatic polyester as finally obtained after the solid-phase polymerization, $$C_A[\text{ppm}] = W_A[g] \div W_P[g] \times 10^6 \quad (12)$$

wherein $W_A$ [g] is the weight of the catalyst remaining in the aliphatic polyester as finally obtained after the solid-phase polymerization, and $W_P$ [g] is the weight of the aliphatic polyester as finally obtained after the solid-phase polymerization.

[8] The process for producing aliphatic polyesters of [6] or [7], wherein the volatile catalyst is an organic sulfonic acid compound.

[9] The process for producing aliphatic polyesters of [8], wherein the organic sulfonic acid compound is at least one selected from the group consisting of methanesulfonic acid, ethanesulfonic acid and 1-propanesulfonic acid, benzenesulfonic acid, p-toluenesulfonic acid and p-chlorobenzenesulfonic acid.

[10] The process for producing aliphatic polyesters of [8] or [9], wherein the catalyst concentration in the aliphatic polyester finally obtained is from 0 to 300 ppm in terms of the sulfur content.

[11] The process for producing aliphatic polyesters of [1], wherein the catalyst is a nonvolatile catalyst.

[12] The process for producing aliphatic polyesters of [11], wherein the nonvolatile catalyst is metal tin or tin(II) oxide.

[13] A process for producing aliphatic polyhydroxycarboxylic acids having a weight-average molecular weight ($Mw_2$) that falls within a numerical range as defined by the following numerical formula (2) and numerical formula (3), the process comprising;

(A) a step of preparing an aliphatic hydroxycarboxylic acid prepolymer having a weight-average molecular weight ($Mw_1$) that falls within a numerical range as defined by the following numerical formula (1), through dehydrating polycondensation of an aliphatic hydroxycarboxylic acid or its oligomer, or an aliphatic hydroxycarboxylic acid or its oligomer, an aliphatic polyol having at least 3 hydroxyl groups, an aliphatic polybasic acid having at least 2 carboxyl groups and/or an anhydride thereof, or an aliphatic hydroxycarboxylic acid or its oligomer, an aliphatic polybasic acid having at least 3 carboxyl groups and/or an anhydride thereof and an aliphatic polyol having at least 2 hydroxyl groups, in the presence or absence of a catalyst and in the presence or absence of a solvent, wherein the amount of the aliphatic polyol having at least 3 hydroxyl groups and the aliphatic polybasic acid having at least 3 carboxyl groups and/or anhydride thereof, is in the range of 0.005 to 10% by weight for the theoretical amount of polymer resulting from complete homo-polymerization of aliphatic hydroxycarboxylic acid, (B) a step of crystallizing the aliphatic hydroxycarboxylic acid prepolymer as prepared in the previous step (A), and (C) a step of dehydrating and polycondensing the aliphatic hydroxycarboxylic acid prepolymer as crystallized in the previous step (B), in a solid phase in the presence of a catalyst:

$$2\times 10^3 \leq Mw_1 \leq 1\times 10^5 \quad (1),$$

$$5\times 10^4 \leq Mw_2 \leq 1\times 10^6 \quad (2),$$

$$Mw_1 < Mw_2 \quad (3).$$

[14] The process for producing aliphatic polyhydroxycarboxylic acids of [13], wherein the step (A) comprises;

(A-1) a step of preparing an aliphatic hydroxycarboxylic acid oligomer having a weight-average molecular weight $Mw_A$ falling within a range as defined by the following numerical formula (7), through dehydrating condensation of an aliphatic hydroxycarboxylic acid component that contains an aliphatic hydroxycarboxylic acid having an asymmetric carbon in an amount of at least 50% of the component, at a reaction temperature $RT_1$ falling within a range as defined by the following numerical formula (4), and (A-2) a step of preparing an aliphatic hydroxycarboxylic acid prepolymer having a weight-average molecular weight $Mw_B$ that falls within a range as defined by the following numerical formula (8) and numerical formula (9), through dehydrating condensation of the aliphatic hydroxycarboxylic acid oligomer as prepared in the previous step (A-1), at a reaction temperature $RT_2$ falling within a range as defined by the following numerical formula (5) and numerical formula (6):

$$50°C. \leq RT_1 \leq 140°C. \quad (4),$$

$$130°C. \leq RT_2 \leq 170°C. \quad (5),$$

$$RT_1 < RT_2 \quad (6),$$

$$750 \leq Mw_A \leq 5\times 10^3 \quad (7),$$

$$2\times 10^3 \leq Mw_B \leq 2\times 10^4 \quad (8),$$

$$Mw_A < Mw_B \quad (9).$$

[15] The process for producing aliphatic polyhydroxycarboxylic acids of [13], wherein the step (A) is carried out in the presence of a catalyst.

[16] The process for producing aliphatic polyhydroxycarboxylic acids of [13], wherein the step (A) is carried out under reduced pressure.

[17] The process for producing aliphatic polyhydroxycarboxylic acids of [13], wherein the step [B] is a crystallization step to crystallize the aliphatic hydroxycarboxylic acid prepolymer by contacting it in a solid state with a liquid not dissolving said prepolymer.

[18] The process for producing aliphatic polyhydroxycarboxylic acids of [13], wherein the step [B] is a crystallization step to solidify and crystallize the aliphatic hydroxycarboxylic acid prepolymer by contacting it in a molten state with a liquid not dissolving said prepolymer.

[19] The process for producing aliphatic polyhydroxycarboxylic acids of [13], wherein the step [B] is a crystallization step to solidify and crystallize the aliphatic hydroxycarboxylic acid prepolymer by contacting a solution of the aliphatic hydroxycarboxylic acid prepolymer as dissolved in a solvent, with a liquid not dissolving said prepolymer.

[20] The process for producing aliphatic polyhydroxycarboxylic acids of any one of [17] to [19], wherein the liquid contains water at least partially.

[21] The process for producing aliphatic polyhydroxycarboxylic acid of [13], wherein the catalyst is a volatile catalyst.

[22] The process for producing aliphatic polyhydroxycarboxylic acid of [13], wherein the catalyst is a nonvolatile catalyst.

[23] The process for producing aliphatic polyhydroxycarboxylic acids of [13], wherein the catalyst is a volatile catalyst, and the residual percentage of the catalyst, R, in the product, which is defined by the following numerical formula (10), is at most 50%:

$$R[\%]=C_A[ppm]\div C_B[ppm]\times 100 \quad (10)$$

wherein R is the residual percentage of the catalyst [%], and this constitutes an index of the variation in the catalyst concentration before and after the dehydrating polycondensation, $C_B$ [ppm] is the theoretical catalyst concentration in the case where all the catalyst as fed into the reaction system for dehydration polycondensation is to remain in the product, aliphatic polyhydroxycarboxylic acid, and this is represented by the following numerical formula (11), and $C_A$ [ppm] is the actual catalyst concentration in the aliphatic polyhydroxycarboxylic acid as finally obtained after the dehydrating polycondensation, and this is represented by the following numerical formula (12):

$$C_B[ppm]=W_B[g]\div W_P[g]\times 10 \quad (11)$$

wherein $W_B$ [g] is the total weight of the catalyst as fed into the reaction system before and/or during the dehydrating polycondensation, and $W_P$ [g] is the weight of the aliphatic polyhydroxycarboxylic acid as finally obtained after the dehydrating polycondensation, $$C_A[ppm]=W_A[g]\div W_P[g]\times 10^6 \quad (12)$$

wherein $W_A$ [g] is the weight of the catalyst remaining in the aliphatic polyhydroxycarboxylic acid as finally obtained after the dehydrating polycondensation, and $W_P$ [g] is the weight of the aliphatic polyhydroxycarboxylic acid as finally obtained after the dehydrating polycondensation.

[24] The process for producing aliphatic polyesters of [1], wherein the aliphatic polyester prepolymer is polylactic acid.

[25] The process for producing aliphatic polyhydroxycarboxylic acid of [13], wherein the aliphatic hydroxycarboxylic acid is L-lactic acid.

DETAILED DESCRIPTION OF THE PREFERRED EMBODIMENTS

The invention is a process for producing aliphatic polyesters having a weight-average molecular weight ($Mw_2$) that falls within a numerical range as defined by the following numerical formula (2) and numerical formula (3) and having at least 50% of aliphatic hydroxycarboxylic acid units, which comprises polymerizing a crystallized, aliphatic polyester prepolymer having a weight-average molecular weight ($Mw_1$) that falls within a numerical range as defined by the following numerical formula (1) and having at least 50% of aliphatic hydroxycarboxylic acid units, in a solid phase in the presence of a catalyst:

$$2\times 10^3 \leq Mw_1 \leq 1\times 10^5 \quad (1)$$

$$5 \times 10^4 \leq Mw_2 \leq 1 \times 10^6 \quad (2),$$

$$Mw_1 < Mw_2 \quad (3).$$

[Solid-Phase Polymerization]

The process of the invention of solid-phase polymerization to produce aliphatic polyesters is characterized in that a crystallized, aliphatic polyester prepolymer (hereinafter referred to as prepolymer) is subjected to dehydrating polycondensation (solid-phase polymerization) in the presence of a catalyst, preferably in a flowing gas atmosphere.

The solid-phase polymerization process of the invention is not specifically defined, provided that the polymer (including the prepolymer and the reaction product, aliphatic polyester) existing in the reaction system is kept substantially solid and that the weight-average molecular weight (Mw) of the aliphatic polyester after the finish of the solid-phase polymerization is larger than the weight-average molecular weight (Mw) of the prepolymer before the start of the solid-phase polymerization.

Precisely, the solid-phase polymerization process of the invention is not specifically defined, provided that the polymer (including the prepolymer and the reaction product, aliphatic polyester) existing in the reaction system is kept substantially solid and that the weight-average molecular weight ($Mw_1$) of the prepolymer before the start of the solid-phase polymerization falls within the range as defined by the numerical formula (1) while the weight-average molecular weight ($Mw_2$) of the aliphatic polyester after the finish of the solid-phase polymerization falls within the range as defined by the numerical formulae (2) and (3):

$$2 \times 10^3 \leq Mw_1 \leq 1 \times 10^5 \quad (1),$$

$$5 \times 10^4 \leq Mw_2 \leq 1 \times 10^6 \quad (2),$$

$$Mw_1 < Mw_2 \quad (3).$$

1) Catalysts in Solid-Phase Polymerization:

In the solid-phase polymerization in the invention, any of volatile catalysts and nonvolatile catalysts is employable as the catalyst. However, preferred are volatile catalysts capable of vaporizing away from the reaction system during the reaction, since the amount of the catalyst residue to remain in the aliphatic polyesters produced could be reduced.

1-1) Volatile Catalysts:

The volatile catalyst for use in the invention is not specifically defined, provided that it substantially promotes the dehydrating polycondensation of prepolymers in the process of the invention and is volatile.

The catalyst volatility as referred to herein is meant to indicate the function of the catalyst capable of controlling its residual percentage, R [%], which is defined by the following numerical formula (10), to be any desired value falling within the numerical range as defined by the following numerical formula (13), relative to the reaction condition group, precisely, to at least one reaction condition of the reaction condition group consisting of the reaction pressure, the reaction temperature, the reaction time, the flow rate of the flowing gas and the particle size of prepolymers, $$0[\%] \leq R[\%] < 100[\%] \quad (13)$$

wherein R [%] is the residual percentage of the catalyst [%] as defined by the following numerical formula (10), and this constitutes an index of the variation in the catalyst concentration before and after the solid-phase polymerization, $$R[\%] = C_A[ppm] \div C_B[ppm] \times 100 \quad (10)$$

wherein $C_B$ [ppm] is the theoretical catalyst concentration in the case where all the catalyst as fed into the reaction system for solid-phase polymerization is to remain in the polyester, and this is represented by the following numerical formula (11); and $C_A$ [ppm] is the actual catalyst concentration in the finally-obtained polyester after the solid-phase polymerization, and this is represented by the following numerical formula (12), $$C_B[ppm] = W_B[g] \div W_P[g] \times 10^6 \quad (11)$$

wherein $W_B$ [g] is the total weight of the catalyst as fed into the reaction system before the solid-phase polymerization; and $W_P$ [g] is the weight of the polyester as finally obtained after the solid-phase polymerization, $$C_A[ppm] = W_A[g] \ W_P[g] \times 10^6 \quad (12)$$

wherein $W_A$ [g] is the weight of the catalyst remaining in the polyester as finally obtained after the solid-phase polymerization; and $W_P$ [g] is the weight of the polyester as finally obtained after the solid-phase polymerization.

When a volatile catalyst is used in the process of the invention, the catalyst concentration, $C_A$ [ppm], to be in the aliphatic polyester as finally obtained after the solid-phase polymerization is smaller than the catalyst concentration, $C_B$ [ppm], which is represented by the numerical formula (11) and is calculated from the weight of the catalyst as fed into the reaction system before the solid-phase condensation.

It can be said that the volatile catalyst of which the residual percentage, R [%], is smaller, is better, and using such a better volatile catalyst gives aliphatic polyesters having higher stability.

Though varying, depending on the type and the amount of the volatile catalyst used and also on the reaction system and the reaction condition, the residual catalyst percentage, R [%], is preferably at most 50%, more preferably at most 20%.

As specific examples of the volatile catalyst for use in the invention, mentioned are organic sulfonic acid compounds.

Concretely, the organic sulfonic acid compounds include, for example, alkanesulfonic acids having from 1 to 10 carbon atoms, such as methanesulfonic acid, ethanesulfonic acid, 1-propanesulfonic acid, 1-butanesulfonic acid, 1-pentanesulfonic acid, 1-hexanesulfonic acid, 1-heptanesulfonic acid, 1-octanesulfonic acid, 1-nonanesulfonic acid, 1-decanesulfonic acid, etc.; halogen-substituted alkanesulfonic acids such as trifluoromethanesulfonic acid, etc.; benzenesulfonic acid and benzenesulfonic acid derivatives such as benzenesulfonic acid, p-toluenesulfonic acid, p-xylene-2-sulfonic acid, p-chlorobenzenesulfonic acid, p-nitrobenzenesulfonic acid, etc.; naphthalenesulfonic acid and naphthalenesulfonic acid derivatives such as naphthalene-1-sulfonic acid, naphthalene-2-sulfonic acid, 2,5-naphthalenedisulfonic acid, etc. Of those, especially preferred are methanesulfonic acid, ethanesulfonic acid, 1-propanesulfonic acid, p-toluenesulfonic acid, and p-chlorobenzenesulfonic acid. These may be used either singly or as combined.

Some organic sulfonic acids noted above will have crystal water. In some cases where those having crystal water are used as the catalyst, the reduction in the weight-average molecular weight of the product, aliphatic polyester, which is caused by the crystal water existing in the catalyst used, will have to be taken into consideration. Where the prepolymer to be polymerized has a weight-average molecular weight (Mw) of not larger than 1,000, the catalyst with crystal water may be added to the reaction system directly as it is. However, where the weight-average molecular weight (Mw) of the prepolymer is larger than 1,000, especially much larger than it, it is desirable that the crystal water which may retard the reaction is removed from the catalyst before the catalyst is added to the reaction system. This is because prepolymers having such a larger weight-average molecular weight (Mw) are influenced more by the crystal water of the catalyst used, whereby the reduction in the weight-average molecular weight of the aliphatic polyesters to be produced from the prepolymers shall be greater.

1-2) Amount of Volatile Catalyst to be Used:

The amount of the volatile catalyst to be used in the invention is not specifically defined, so far as the catalyst added to the reaction system could substantially promote the reaction. The amount of the catalyst may be determined suitably, depending on the properties, such as the volatility and the acid strength, of the catalyst itself and on the reaction condition.

The preferred amount of the volatile catalyst to be used herein varies, depending on the type of the catalyst. In general, the amount is preferably from 0.00005 to 10% by weight of the aliphatic polyester to be produced, but more preferably from 0.0001 to 5% by weight in view of the economical aspect, even more preferably from 0.0001 to 2% by weight.

1-3) Nonvolatile Catalysts:

The nonvolatile catalyst for use in the invention is not specifically defined, so far as it substantially promotes the solid-phase polymerization in the process of the invention.

As specific examples of the nonvolatile catalyst usable herein, mentioned are metals of the Groups II, III, IV and V of the Periodic Table, their oxides and salts, etc.

More concretely, the nonvolatile catalyst for use in the invention includes, for example, metals such as zinc powder, tin powder, aluminum, magnesium, germanium, etc.; metal oxides such as tin(II) oxide, antimony(III) oxide, zinc oxide, aluminum oxide, magnesium oxide, titanium(IV) oxide, germanium(IV) oxide, etc.; metal halides such as tin(II) chloride, tin(IV) chloride, tin(II) bromide, tin(IV) bromide, antimony(III) fluoride, antimony(V) fluoride, zinc chloride, magnesium chloride, aluminum chloride, etc.; sulfates such as tin(II) sulfate, zinc sulfate, aluminum sulfate, etc.; carbonates such as magnesium carbonate, zinc carbonate, etc.; borates such as zinc borate, etc.; organic carboxylates such as tin(II) acetate, tin(II) octanoate, tin(II) lactate, zinc acetate, aluminum acetate, etc.; organic sulfonates such as tin(II) trifluoromethanesulfonate, zinc trifluoromethanesulfonate, magnesium trifluoromethanesulfonate, tin(II) methanesulfonate, tin(II) p-toluenesulfonate, etc.

As other examples of the catalyst, further mentioned are organic metal oxides with the above-mentioned metals, such as dibutyltin oxide, etc.; metal alkoxides with the above-mentioned metals such as titanium isopropoxide, etc.; alkyl metals with the above-mentioned metals such as diethyl zinc, etc.

Of those, preferred are tin powder (metal tin), tin(II) oxide, etc. These catalysts may be used either singly or as combined.

1-4) Amount of Nonvolatile Catalyst to be Used:

The amount of the nonvolatile catalyst to be used in the invention is not specifically defined, so far as the catalyst added to the reaction system could substantially promote the reaction.

The amount of the nonvolatile catalyst to be used herein varies, depending on the type of the catalyst. In general, the amount is preferably from 0.00005 to 5% by weight of the polyester to be produced, but more preferably from 0.0001 to 1% by weight in view of the economical aspect.

2) Reaction Temperature in Solid-Phase Polymerization:

The reaction temperature in solid-phase polymerization is not specifically defined, provided that the polymer (including the prepolymer and the reaction product, aliphatic polyester) existing in the reaction system is kept substantially solid. In consideration of the polymerization rate and the volatility of the volatile catalyst, if used, such as that mentioned hereinabove, it is preferable that the reaction temperature is not lower than 100° C. but lower than the melting point (Tm) of the polymer (including the prepolymer and the reaction product, aliphatic polyester).

Where a volatile catalyst is used in polymerization, in general, the polymerization rate will be higher when the reaction temperature is higher, and, as a result, the catalyst will evaporate away more easily from the reaction system. Therefore, where a volatile catalyst is used in the invention and where high-molecular aliphatic polyesters are intended to be produced, the reaction temperature shall be determined to fall within a temperature range not higher than the melting point (Tm) of the polymer (including the prepolymer and the reaction product, aliphatic polyester), in consideration of the evaporation rate of the catalyst used.

3) Solid-Phase Polymerization in Flowing Gas Atmosphere:

In the invention, the solid-phase polymerization is preferably carried out in a flowing gas atmosphere, since water having been formed through the polymerization is to be removed away from the reaction system.

Flowing gas can be used for the solid-phase polymerization in the invention, and this is a vapor to flow in the reaction system. Examples of the gas include inert gases such as nitrogen gas, helium gas, argon gas, xenon gas, krypton gas, etc.; dry air and the like. Above all, preferred are inert gases.

It is preferable that the water content of the flowing gas is as small as possible and, more preferably, the flowing gas contains substantially no water. If the water content of the flowing gas is too large, water having been formed through the solid-phase polymerization could not be removed efficiently, whereby the polymerization rate will be lowered unfavorably. For this purpose, the flowing gas to be used may be previously passed through molecular sieves or through layers filled with ion exchange resins or the like so as to dewater it.

Where the water content of the flowing gas is indicated by the dew point thereof, it is preferable that the dew point of the gas is not higher than −20° C., more preferably not higher than −50° C.

The flow rate of the flowing gas is not specifically defined, so far as water having been formed through the reaction could be removed away from the reaction system to such a degree that aliphatic polyesters having a sufficiently high weight-average molecular weight could be produced through the reaction. The flow rate of the flowing gas may be determined in consideration of the polymerization rate, the type and the amount of the volatile catalyst, if used, and the vaporization rate of the volatile catalyst to vaporize away from the reaction system.

The effect of the flowing gas which flows in the reaction system is that water having been formed through the solid-phase polymerization is efficiently removed out of the reaction system whereby aliphatic polyesters having a sufficiently high weight-average molecular weight could be produced efficiently.

The flow rate of the flowing gas may be suitably determined in consideration of the polymerization rate, the type and the amount of the volatile catalyst, if used, the vaporization rate and efficiency of the volatile catalyst to vaporize away from the reaction system that contains the polyester formed in the step of dehydrating polymerization, the rate and the efficiency of removing water having been formed through the solid-phase polymerization, and the final weight-average molecular weight (Mw) of the product, aliphatic polyester.

In general, water having been formed through solid-phase polymerization could be removed more efficiently when the amount of the flowing gas in the reaction system is larger. On the other hand, however, when the amount of the flowing gas is large, the vaporization rate of the volatile catalyst, if used, to vaporize away from the solid-phase polymerization system that produces aliphatic polyesters will be also large. Therefore, when aliphatic polyesters having a large weight-average molecular weight (for example, Mw=$5 \times 10^4$ to $1 \times 10^6$) are desired to be produced, the flow rate of the flowing gas to be in the reaction system must be so controlled that it is on a predetermined level at least in a part of the step of solid-phase polymerization.

In general, where aliphatic polyesters having a large weight-average molecular weight (for example, Mw=$5 \times 10^4$ to $1 \times 10^6$) are desired to be produced, it is preferable that the flow rate of the flowing gas falls between 0.02 and 200 ml/min, per gram of the prepolymer being polymerized, more preferably between 0.5 and 150 ml/min, even more preferably between 1.0 and 100 ml/min.

In general, if the flow rate of the flowing gas is smaller than 0.02 ml/min, per gram of the prepolymer being polymerized, the efficiency of removing water having been formed in the solid-phase polymerization is significantly poor, thereby resulting in that aliphatic polyesters having a large weight-average molecular weight (for example, Mw=$5 \times 10^4$ to $1 \times 10^6$) could not be obtained. It is desirable that the linear flow rate of the flowing gas falls between 0.01 and 500 cm/sec.

4) Solid-Phase Polymerization under Reduced Pressure:

The degree of reduced pressure in the reaction system for solid-phase polymerization under reduced pressure is not specifically defined, so far as it ensures substantial solid-phase polymerization to give aliphatic polyesters having a sufficiently large weight-average molecular weight (for example, Mw=$5 \times 10^4$ to $1 \times 10^6$).

The degree of reduced pressure in the reaction system for solid-phase polymerization under reduced pressure could be suitably determined, in consideration of the polymerization rate, the type and the amount of the volatile catalyst used, the vaporization rate and efficiency of the volatile catalyst to vaporize away from the reaction system that contains the polyester formed in the step of dehydrating polymerization, the rate and the efficiency of removing water having been formed through the solid-phase polymerization, and the final weight-average molecular weight (Mw) of the product, aliphatic polyester.

5) Solid-Phase Polymerization under Pressure:

The degree of pressure in the reaction system for solid-phase polymerization under pressure is not specifically defined, so far as it ensures substantial solid-phase polymerization to give aliphatic polyesters having a sufficiently large weight-average molecular weight (for example, Mw=$5 \times 10^4$ to $1 \times 10^6$).

The degree of pressure in the reaction system for solid-phase polymerization under pressure could be suitably determined, in consideration of the polymerization rate, the type and the amount of the volatile catalyst used, if used, the vaporization rate and efficiency of the volatile catalyst to vaporize away from the reaction system that contains the aliphatic polyester formed in the step of solid-phase polymerization, the rate and the efficiency of removing water having been formed through the solid-phase polymerization, and the final weight-average molecular weight (Mw) of the product, aliphatic polyester.

In general, the volatile catalyst used could hardly vaporize away from the reaction system in solid-phase polymerization under reduced pressure.

[Preparation of Prepolymers]

The prepolymer to be subjected to solid-phase polymerization in the invention, which has at least 50% of aliphatic hydroxycarboxylic acid units and has a weight-average molecular weight, $Mw_1$, satisfying the numerical formula (1), $$2 \times 10^3 \leq Mw_1 \leq 1 \times 10^5 \qquad (1),$$

includes the following:

(a) Homopolymers or copolymers (DL-copolymers, etc.) of aliphatic polyhydroxycarboxylic acids to be obtained from aliphatic hydroxycarboxylic acids, or mixtures thereof (b) Copolymers or mixtures of aliphatic polyhydroxycarboxylic acids with polyesters of aliphatic diols and aliphatic dibasic acids (c) Copolymers or mixtures of aliphatic polyhydroxycarboxylic acids and polysaccharide (d) Copolymers or mixtures of aliphatic polyhydroxycarboxylic acids, polysaccharides, and polyesters of aliphatic diols and aliphatic dibasic acids (e) Star polymers comprising aliphatic hydroxycarboxylic acids, aliphatic polyols having at least 3 hydroxyl groups and aliphatic polybasic acids having at least 2 carboxyl groups (f) Star polymers comprising aliphatic hydroxycarboxylic acids, aliphatic polybasic acids having at least 3 carboxyl groups and aliphatic polyols having at least 2 hydroxyl groups The aliphatic hydroxycarboxylic acids for producing the prepolymers of (a) to (f) are not specifically defined. Preferred examples of the acids include lactic acid, as well as glycolic acid, 3-hydroxybutyric acid, 4-hydroxybutyric acid, 4-hydroxyvaleric acid, 5-hydroxyvaleric acid, 6-hydroxycaproic acid, etc. These hydroxycarboxylic acids may be used either singly or as combined. Lactic acid or the like having an asymmetric carbon atom in the molecule includes D-form, L-form and their equimolar mixture (racemate), any of which is employable herein so far as the prepolymers to be obtained from them are crystalline. Above all, especially preferred is L-lactic acid to be produced through fermentation and having an optical purity of at least 95%, preferably at least 98%.

The aliphatic diols for producing the prepolymers of (b) and (d) are not specifically defined. Preferred examples of the diols include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentylglycol, 1,4-cyclohexanedimethanol, etc. These may be used either singly or as combined. The diols having an asymmetric carbon in the molecule will include D-forms, L-forms and their equimolar mixtures (racemates), any of which is employable herein.

The aliphatic dibasic acids for producing the prepolymers of (b) and (d) are not specifically defined. Preferred examples of the aliphatic dibasic acids include aliphatic dicarboxylic acids such as succinic acid, oxalic acid, malonic acid, glutaric acid, adipic acid, pimelic acid, suberic acid, azelaic acid, sebacic acid, undecane-diacid, dodecane-diacid, 3,3-dimethylpentane-diacid, etc.; and alicyclic dicarboxylic acids such as cyclohexanedicarboxylic acid, etc. These may be used either singly or as combined. The dibasic acids having an asymmetric carbon atom in the molecule will include D-forms, L-forms and their equimolar mixtures (racemates), any of which is employable herein.

The polysaccharides for producing the prepolymers of (c) are not specifically defined. Specific examples of the polysaccharides include cellulose, cellulose nitrate, cellulose acetate, methyl cellulose, ethyl cellulose, CMC (carboxymethyl cellulose), nitrocellulose, regenerated celluloses such as cellophane, viscose rayon, cupra, etc.; as well as hemicellulose, starch, amylopectin, dextrin, dextran, glycogen, pectin, chitin, chitosan, etc.; and their mixtures and derivatives. Of those, especially preferred are cellulose esters such as cellulose acetate, and cellulose ethers such as ethyl cellulose.

Preferably, the polysaccharides have a weight-average molecular weight of at least 3,000, more preferably at least 10,000. Also preferably, the cellulose esters and the cellulose ethers have a degree of substitution of from 0.3 to 3.0, more preferably from 1.0 to 2.8.

The aliphatic polyols having at least 2 hydroxyl groups for producing the prepolymers of (e) and (f) are not specifically defined. Specific examples of the aliphatic polyols having at least 2 hydroxyl groups include the aliphatic diols mentioned above, as well as glycerin, pentaerythritol, dipentaerythritol, trimethylolethane, trimethylolpropane, inositol, etc. These may be used either singly or as combined. The polyols having an asymmetric carbon atom in the molecule will include D-forms, L-forms and their equimolar mixtures (racemates), any of which is employable herein.

The aliphatic polybasic acids having at least 2 carboxyl groups for producing the prepolymers of (e) and (f) are not specifically defined. Specific examples of the aliphatic polybasic acids having at least 2 carboxyl groups include the aliphatic dibasic acids mentioned above, as well as cyclic compounds such as 1,2,3,4,5,6-cyclohexanehexacarboxylic acid, 1,2,3,4-cyclopentane-tetracarboxylic acid, tetrahydrofuran-2R,3T,4T,5C-tetracarboxylic acid, 1m2m3m4-cyclobutane-tetracarboxylic acid, 4-carboxy-1,1-cyclohexane-diacetic acid, 1,3,5-cyclohexane-tricarboxylic acid, (1α,3α,5β)-1,3,5-trimethyl-1,3,5-cyclohexane-tricarboxylic acid, 2,3,4,5-furan-tetracarboxylic acid, etc., and their anhydrides; linear compounds such as butane-1,2,3,4-tetracarboxylic acid, meso-butane-1,2,3,4-tetracarboxylic acid, 1,3,5-pentane-tricarboxylic acid, 2-methylolpropane-tricarboxylic acid, 1,2,3-propane-tricarboxylic acid, 1,1,2-ethane-tricarboxylic acid, 1,2,4-butane-tricarboxylic acid, etc., and their anhydrides. These may be used either singly or as combined. The polybasic acids having an asymmetric carbon atom in the molecule will include D-forms, L-forms and their equimolar mixtures (racemates), any of which is employable herein.

The prepolymers of (a), (e) and (f) can be prepared through dehydrating polycondensation of aliphatic hydroxycarboxylic acids, or aliphatic hydroxycarboxylic acids with aliphatic polyols having at least 3 hydroxyl groups and aliphatic polybasic acids having at least 2 carboxyl groups, or aliphatic hydroxycarboxylic acids with aliphatic polybasic acids having at least 3 carboxyl groups and aliphatic polyols having at least 2 hydroxyl groups.

The prepolymers of (a), (b), (c) and (d) can be prepared in the step of producing aliphatic polyhydroxycarboxylic acids through dehydrating polycondensation of aliphatic hydroxycarboxylic acids, by mixing or copolymerizing the aliphatic hydroxycarboxylic acids with other aliphatic hydroxycarboxylic acids, with polyesters of aliphatic polyols and aliphatic polybasic acids, or with polysaccharides.

The process of preparing prepolymers through dehydrating polycondensation includes melt polymerization and solution polymerization using an organic solvent, for which any known method may be selected and employed in accordance with the intended weight-average molecular weight (Mw) of the prepolymers to be prepared and in consideration of the easiness in operating the reaction system. For the process, for example, referred to are the melt polymerization method described in JP-A 59-96123, and the solution polymerization method described in U.S. Pat. Nos. 5,310,865, 5,401,796, 5,817,728, and EP-A-0829503.

Where a catalyst is used for producing prepolymers in the invention, any of volatile catalysts and nonvolatile catalysts as used in the solid-phase polymerization noted above may be directly used for it.

In general, in the solution polymerization method using an organic solvent, prepolymers having a weight-average molecular weight of at least 15,000 could be prepared efficiently. The solution polymerization method for dehydrating polycondensation of lactic acid is characterized in that the condenser is prevented from being clogged owing to the crystallization of the side product, lactide. On the other hand, the melt polymerization method not using an organic solvent is characterized in that its operation is simple and easy as not requiring solvent removal.

However, if aliphatic hydroxycarboxylic acids having an asymmetric carbon atom, such as lactic acid, are subjected to dehydrating polycondensation at a high reaction temperature falling between 220 and 260° C., according to the melt polymerization method such as that described in JP-A 59-96123, the optical purity of the resulting prepolymers will be low, and, in addition, the shapability of the aliphatic polyesters to be produced from the prepolymers through solid-phase polymerization will be poor. Therefore, it is desirable that such aliphatic hydroxycarboxylic acids having an asymmetric carbon atom, such as lactic acid and the like, are subjected to dehydrating polycondensation under the reaction conditions mentioned below.

The preferred process for preparing aliphatic polyhydroxycarboxylic acid prepolymers comprises a first step of preparing an aliphatic hydroxycarboxylic acid oligomer having a weight-average molecular weight $Mw_A$ falling within a range as defined by the following numerical formula (7), through dehydrating condensation of an aliphatic hydroxycarboxylic acid component that contains at least 50% by weight of an aliphatic hydroxycarboxylic acid having an asymmetric carbon atom, or its oligomer, in the presence or absence of a catalyst and in the presence or absence of an organic solvent, at a reaction temperature $RT_1$ falling within a range as defined by the following numerical formula (4), and a second step of preparing an aliphatic hydroxycarboxylic acid prepolymer having a weight-average molecular weight $Mw_B$ falling within a range as defined by the following numerical formula (8) and numerical formula (9), through dehydrating condensation of the aliphatic hydroxycarboxylic acid oligomer as prepared in the first step, at a reaction temperature $RT_2$ falling within a range as defined by the following numerical formula (5) and numerical formula (6):

$$50° C. \leq RT_1 \leq 140° C. \qquad (4),$$

$$130° C. \leq RT_2 \leq 170° C. \qquad (5),$$

$$RT_1 < RT_2 \tag{6}$$

$$750 \leq Mw_A \leq 5 \times 10^3 \tag{7}$$

$$2 \times 10^3 \leq Mw_B \leq 2 \times 10^4 \tag{8}$$

$$Mw_A \leq Mw_B \tag{9}$$

The aliphatic hydroxycarboxylic acid component that contains at least 50% by weight of an aliphatic hydroxycarboxylic acid having an asymmetric carbon atom, or its oligomer can include an aliphatic polyol having at least 3 hydroxyl groups and an aliphatic polybasic acid having at least 2 carboxyl groups and/or an anhydride thereof, or an aliphatic hydroxycarboxylic acid, an aliphatic polybasic acid having at least 3 carboxyl groups and/or an anhydride thereof and an aliphatic polyol having at least 2 hydroxyl groups to obtain a star polymer having an excellent melt tension.

As the aliphatic hydroxycarboxylic acid having an asymmetric carbon atom, L-lactic acid is preferable. And the above mentioned aliphatic polyol and poly basic acid are used.

And the amount of the aliphatic polyol having at least 3 hydroxyl groups and the aliphatic polybasic acid having at least 3 carboxyl groups and/or anhydride thereof, is in the range of 0.005 to 10% by weight, preferably 0.01 to 5% by weight for the theoretical amount of polymer resulting from complete homo-polymerization of the hydroxycarboxylic acid.

And further, the equivalent ratio of the hydroxyl group to carboxyl group in the aliphatic polyol having at least 3 hydroxyl groups and the aliphatic polybasic acid having at least 2 carboxyl groups and/or the anhydride thereof, or the equivalent ratio of the hydroxyl group to carboxyl group in aliphatic polybasic acid having at least 3 carboxyl groups and/or the anhydride thereof and the aliphatic polyol having at least 2 hydroxyl groups is 100:50–200, preferably 100:80–120, more preferably 100:90–110.

When the amount of the aliphatic polyol having at least 3 hydroxyl groups and the aliphatic polybasic acid having at least 2 carboxyl groups and/or the anhydride thereof is less than 0.005% by weight, melt tension of the resulting star polymer after solid-phase polymerization becomes insufficient On the other hand, when the amount exceeds 10% by weight, the resulting star polymer after solid-phase polymerization tends to become brittle.

And when the equivalent ratio of the hydroxyl group to carboxyl group in the aliphatic polyol having at least 3 hydroxyl groups and the aliphatic polybasic acid having at least 2 carboxyl groups and/or the anhydride thereof, or the aliphatic polybasic acid having at least 3 carboxyl groups and/or the anhydride thereof and the aliphatic polyol having at least 2 hydroxyl groups is outside of the above range, melt tension of the resulting star polymer after solid-phase polymerization becomes insufficient, or the molecular weight of the star polymer does not increase and the star polymer having practical strength becomes difficult to obtain.

(1) First Step:

The first step is not specifically defined for its reaction condition, provided that the dehydrating polycondensation is effected at a relatively low reaction temperature falling within the range defined by the numerical formula (4). Where a catalyst is used in the step, any one usable in the solid-phase polymerization in the invention may be used directly as it is. Where an organic solvent is used therein, any one as used in U.S. Pat. No. 5,310,865 may be used directly as it is. It is desirable that the reaction in this step is effected in an inert gas atmosphere and/or under reduced pressure.

Depending on the molecular weight of the products to be produced and on the easiness in operating the step, an organic solvent may be used, and any desired reaction condition may be selected for the step. For example, for dehydrating polycondensation of aliphatic hydroxycarboxylic acids having an asymmetric carbon atoms such as lactic acid, in the step, using an organic solvent is preferred, since the ducts in the condenser and other parts in the reactor, which may be clogged owing to the condensation and crystallization of the cyclic dimer of lactic acid, lactide, to be formed in the equilibrated reaction with the oligomer formed, could be readily prevented from being clogged. On the other hand, not using an organic solvent in the step has the advantage of simple operation, since solvent separation from the oligomer formed is unnecessary.

The molecular weight of the oligomers to be prepared in the step preferably falls between 750 and 2,000 in terms of the weight-average molecular weight (Mw) thereof, more preferably between 1,000 and 2,000, most preferably between 1,500 and 2,000. If the weight-average molecular weight, Mw, of the oligomers prepared is smaller than 750, the temperature in the next second step of polycondensation must be high. However, at such high temperatures, it will be difficult to prevent the racemation of aliphatic hydroxycarboxylic acids having an asymmetric carbon atom. If so, as a result, the optical purity of the aliphatic polyhydroxycarboxylic acid oligomers to be produced as prepolymers in the second step will be unfavorably lowered. On the other hand, when oligomers having a weight-average molecular weight of larger than 2,000 are prepared in the first step, the optical purity of the oligomers produced could be prevented from being lowered. However, the case brings about a problem in that the polymerization time is unfavorably prolonged. To increase the molecular weight of the oligomers through continuous polymerization in a defined temperature range, the amount of the catalyst to be added to the reaction system must be increased, and, in addition, the reaction system must be in a severe condition in higher vacuum (for example, at most 5 mmHg). In that condition, the catalyst removal from the prepolymers produced requires complicated operation, and, in addition, some particular apparatus will be needed for maintaining the high vacuum. For these reasons, preparing oligomers having such a high molecular weight in this first step is disadvantageous, inconvenient and unfavorable in view of the industrial aspect.

(2) Second Step:

In the second step, the molecular weight of the oligomers as prepared in the previous first step is increased within a short period of time to give aliphatic hydroxycarboxylic acid prepolymers having a desired molecular weight. The condition for the polycondensation in this second step is not specifically defined and may be the same as that for the condensation in the previous first step, except that the temperature range for the second step is defined by the numerical formulae (5) and (6). Regarding the temperature range for the second step, if the temperature is lower than 130° C., the reaction speed in the step is unfavorably lowered. On the other hand, if it is higher than 170° C., the reaction speed will be high, but the optical purity of the prepolymers formed will be lowered owing to the racemation of the aliphatic hydroxycarboxylic acid component having an asymmetric carbon atom. If so, in addition, the prepolymers formed will be unfavorably colored.

(3) Molecular Weight of Aliphatic Hydroxycarboxylic Acid Prepolymers:

The weight-average molecular weight (Mw) and the molecular weight distribution of the aliphatic hydroxycarboxylic acid prepolymers could be controlled to be any desired ones, by suitably determining the type and the amount of the catalyst to be used, and selecting the reaction condition of the reaction temperature, the reaction time, etc. According to the preferred process noted above, it is possible to favorably prepare aliphatic hydroxycarboxylic acid prepolymers having a weight-average molecular weight, $Mw_B$, of at most 20,000, and, in particular, it is possible to favorably prepare those having a weight-average molecular weight, $Mw_B$, of from 2,000 to 20,000 at the end of the second step. Producing aliphatic hydroxycarboxylic acid prepolymers having a weight-average molecular weight, $Mw_B$, of larger than 20,000 will be possible in the process, which, however, is unfavorable, since the aliphatic hydroxycarboxylic acid prepolymers produced and even the aliphatic polyhydroxycarboxylic acids to be produced through solid-phase polymerization of the prepolymers will be unfavorably colored.

Crystallization of Prepolymers:

The reaction mixture (prepolymer) as obtained through dehydrating polycondensation is solidified, and the resulting solid prepolymer is crystallized.

1) Solidification of Prepolymers:

The method of preparing the solid prepolymer is not specifically defined, for which any desired means may be suitably selected, depending on the presence or absence of the organic solvent in the previous, dehydrating polycondensation step of preparing the prepolymer, the crystallinity of the prepolymer and the amount of the prepolymer.

For solidifying the prepolymer, for example, the organic solvent, if used in the previous step of preparing the prepolymer, shall be removed through evaporation. In particular, when the amount of the organic solvent used is small (for example, when the prepolymer concentration in the reaction mixture is at least 90%), the reaction mixture may be directly contacted with a liquid such as water or the like to thereby solidify the prepolymer. On the other hand, when no organic solvent is used in the previous step of preparing the prepolymer, the reaction mixture may be simply cooled, or may be contacted with a liquid such as water or the like to thereby solidify the prepolymer.

In order that the solid prepolymer to be obtained is intended to have any desired form (of, for example, powder, particles, granules, pellets and others), some suitable treatment such as that to be mentioned below will be applied to the solidification step.

(1) Preparation of Powdery Solid Prepolymers:

For obtaining powdery solid prepolymers, the method is not specifically defined. For example, when a solvent is used in the previous dehydrating polycondensation step, the prepolymer formed could be crystallized and precipitated in the reaction solution, and it will be powdery.

(2) Preparation of Granular or Pelletized Solid Prepolymers:

For obtaining granular or pelletized solid prepolymers, the method is not specifically defined. For example, bulky prepolymers prepared may be pulverized or pelletized, or a solution of a prepolymer prepared or a molten prepolymer may be contacted with a liquid such as water or the like, thereby obtaining the intended, granular or pelletized solid prepolymers.

The method of contacting the molten prepolymer or the prepolymer which is in the form of its solution is not specifically defined. For example, the molten prepolymer may be dripped into water so as to solidify it in water, whereby are obtained spherical pellets of the prepolymer. Alternatively, the molten prepolymer may be contacted with a liquid such as water or the like so as to solidified it, and the resulting solid prepolymer may be directly crystallized in the next crystallization step as will be mentioned hereinunder.

The prepolymer as prepared in the previous dehydrating polycondensation step may be transferred into an extruder, through which it may be pelletized. During the pelletization in the extruder, the organic solvent, if used, may be removed by evaporation.

The pelletizer to be used for the method is not specifically defined. For example, it includes Sandvic's Strip Former, Funnel Former, and Double-roll Feeder, Kaizer's Rotary Drop Former, and Piston Drop Former, Mitsubishi Chemical Engineering's Drum Cooler, Nippon Belding's Steel Belt Cooler, and Hybrid Former, etc.

The devices to be used in the invention for forming melt drops or solution drops of prepolymers such as polylactic acid and others are not specifically defined. One example of the devices is Kaizer's Pustulator.

The shape of the prepolymer pellets and granules is not specifically defined. It is not always necessary that the pellets and the granules are in any specific form of ground blocks, chips, spheres, columnar beads, marbles, tablets and others. In general, however, they are preferably in the form of spheres, columnar beads or marbles.

(3) Particle Size of Solid Prepolymers:

The particle size of the solid prepolymers is not specifically defined, and it may be determined suitably in consideration of the easiness in handling the prepolymers in the step of polymerizing them in a solid phase, and of the evaporation rate and efficiency of the volatile catalyst to vaporize in the solid-phase polymerization step. In particular, the particle size of the solid prepolymers will be so determined that the volatile catalyst used could satisfactorily exhibit its volatility in the solid-phase polymerization step.

In that manner, considering the surface area of the solid prepolymer per the unit weight thereof so that the volatile catalyst used could satisfactorily exhibit its volatility, the particle size of the solid prepolymer falls, in general, preferably between 10 $\mu$m and 10 mm, more preferably between 0.1 mm and 10 mm, even more preferably between 1 mm and 5 mm.

(4) Addition of Polymerization Catalyst in the Step of Preparing Solid Prepolymers:

In the step of preparing the solid prepolymers, the catalyst to be used in the solid-phase polymerization step may be added to the prepolymers. The method of adding the catalyst is not specifically defined. It is desirable that the catalyst added is uniformly dispersed in the prepolymers. For example, the catalyst may be added to bulky prepolymers being pulverized or to prepolymers being pelletized.

2) Crystallization of Prepolymers:

The prepolymers having been solidified in the manner noted above are crystallized.

In the invention, the crystallization is meant to obtain solids having a heat of crystallization of at most 30 J/g as measured through differential scanning calorimetry (for which the weight of the sample is 5 mg, the temperature runs between 20° C. and 200° C., and the heating rate is 10° C./min)

The method of crystallization of prepolymers is not specifically defined, for which are employable any known means of, for example, heating solid prepolymers in a vapor phase. In the invention, preferably, the solid prepolymers to be crystallized are contacted with a liquid.

It is written in JP-A 8-34843 that low-molecular polyesters are brittle and are therefore problematic in that their pellets being prepared through melt pelletization are cracked, broken or powdered. The crystallization of solid prepolymers through their contact with a liquid as in the present invention solves the problem in the related art, and is advantageous in that the prepolymers being crystallized are protected from being fused together, and that the crystallization may be attained at low temperatures within a short period of time.

(1) Method of Crystallization:

In the invention, the method of contacting prepolymers with a liquid for crystallizing the prepolymers is not specifically defined.

For example, where the prepolymers to be crystallized are solid, the solid prepolymers maybe introduced into a liquid so as to make them contacted with the liquid, or, on the contrary, a liquid may be applied to the solid prepolymers so as also to make the prepolymers contacted with the liquid.

For introducing solid prepolymers into a liquid, for example, employable are a method of using a tank, a method of using a tower, etc. In the method of using a tank, the mixture therein will be or will not be stirred. However, in order not to make the particles of the prepolymer contacted with each other in the tank, stirring the mixture therein is preferred. In the method of using a tower, the solid prepolymer may be contacted with a liquid in counter-current streams or in parallel streams. As the case may be, the solid prepolymer may be applied to a flowing liquid.

In the method of contacting the solid prepolymer with a liquid by applying the liquid to the solid prepolymer, for example, the liquid may be sprayed over the solid prepolymer, or the liquid may be passed through a column filled with the solid prepolymer.

(2) Liquids to be Used for Crystallization:

The liquid to be used for crystallizing solid prepolymers may be any and every one that does not dissolve the solid prepolymers at temperatures at which the prepolymers are crystallized with the liquid. For example, any ordinary solvent may be used for that purpose, including water, alcohols, aliphatic hydrocarbons, aromatic hydrocarbons, ketones, ethers, esters, etc. These may be used either singly or as combined. If desired, organic acids may be added to the solvents.

Concretely, the alcohols include, for example, methanol, ethanol, propanol, iso-propanol, butanol, iso-butanol, sec-butanol, tert-butanol, pentanol, iso-pentanol, tert-pentanol, hexanol, iso-hexanol, tert-hexanol, cyclohexanol, etc. The aliphatic hydrocarbons include, for example, hexane, cyclohexane, n-heptane, n-octane, n-nonane, n-decane, n-undecane, n-dodecane, n-tridecane, n-tetradecane. The aromatic hydrocarbons include, for example, benzene, toluene, xylene, mesitylene, cumene, cymene, styrene, ethylbenzene. The ketones include, for example, acetone, methyl ethyl ketone. The ethers include, for example, methyl t-butyl ether, dibutyl ether, anisole. The esters include, for example, ethyl acetate, butyl acetate, methyl lactate, ethyl lactate, butyl lactate.

Of those liquids, preferred is water.

Where the prepolymer is polylactic acid, it is desirable that the crystallization of the prepolymer, polylactic acid is effected through contact with water. As compared with ordinary crystallization to be effected in a vapor phase under heat, the crystallization through contact with water is preferred, since the polymer to be obtained from the crystallized prepolymer through solid-phase polymerization is protected from being unfavorably colored.

(3) Concentration of Prepolymers in Crystallization:

It is desirable that the amount of the solid prepolymer to be crystallized falls between 0.1% by weight and 100% by weight, based on the total weight of the liquid and the prepolymer to be processed within a period of unit time, but more preferably between 1% by weight and 80% by weight. If the amount of the solid prepolymer to be crystallized is larger than 80% by weight, the prepolymer will unfavorably fuse with ease when the temperature of the liquid used for the crystallization is not lower than the glass transition point of the prepolymer.

(4) Crystallization Temperature:

The temperature at which the prepolymer is contacted with the liquid for crystallization may be not lower than the solidification point of the liquid used but lower than the melting point of the prepolymer. However, for more efficient crystallization, it is desirable that the crystallization temperature is not lower than the glass transition point of the prepolymer but not higher than the melting point thereof. When the crystallization temperature is not lower than the glass transition point of the prepolymer, the solid particles of the prepolymer being contacted with each other will fuse together, but the fusion could be prevented by the liquid existing between the prepolymer particles. Even when the crystallization temperature is lower than the glass transition point of the prepolymer, the prepolymer could be crystallized. In that case, however, the crystallization time is long, and the crystallization efficiency is poor.

The temperature of the liquid may be gradually elevated or may be gradually lowered within the defined range. As the case may be, the surface of the prepolymer particles is first crystallized at the liquid temperature not higher than the glass transition point of the prepolymer, and thereafter the liquid temperature may be gradually elevated so as to increase the crystallization efficiency. Where the liquid is gradually heated or cooled, the heating or cooling rate is not specifically defined, but preferably falls between 0.1 and 20° C./min.

For continuous crystallization, it is desirable that the liquid temperature is kept constant.

(5) Crystallization Time:

The period of time for which the prepolymer is contacted with the liquid for crystallization is not specifically defined, provided that the prepolymer could be crystallized within the period of time. However, since impurities could be removed from the prepolymer during crystallization, the crystallization time may be suitably determined in consideration of the degree of purification of the prepolymer and of the easiness in drying the crystallized prepolymer. In general, the crystallization time preferably falls between 1 and 180 minutes, more preferably between 10 and 120 minutes. When the prepolymer to be crystallized has a molecular weight of not larger than 10,000 and when it is contacted with the liquid for crystallization for a period of longer than 180 minutes, the strength of the crystallized prepolymer will be unfavorably lowered. For example, polylactic acid having a molecular weight of 10,000 could be crystallized in the presence of water (liquid for crystallization) at 50° C. within 30 minutes.

(6) Drying of Crystallized Prepolymers:

After the prepolymer has been crystallized through contact with a liquid, the crystallized prepolymer is separated from the liquid in some known method. After having been separated from the liquid, the crystallized prepolymer is dried also in some known method to obtain a dry crystallized prepolymer.

In any stage of the crystallization step, a catalyst for solid-phase polymerization, which may be either a volatile catalyst or a nonvolatile catalyst, maybe added to the reaction system.

Applications of aliphatic Polyesters:

The aliphatic polyesters of the invention are favorable to substitutes for general-purpose resins which, prior to the present application, have heretofore been known and used for medical applications, food wrapping applications and other various applications.

The applications of the aliphatic polyesters of the invention are not specifically defined. However, as having a significantly large weight-average molecular weight and having good mechanical properties (tensile strength, elasticity, breaking strength, etc.), the aliphatic polyesters are favorable even to applications to food containers, industrial fibers, tire cords, base films for magnetic tapes.

Molding and Working Methods for Aliphatic Polyesters of the Invention, and Their Applications:

Molding and working methods for the aliphatic polyesters to be obtained according to the invention are not specifically defined. Concretely, the aliphatic polyesters may be molded and worked, for example, through injection molding, extrusion molding, inflation molding, extrusion blow molding, foaming, calender molding, blow molding, balloon molding, vacuum molding, spinning, etc.

The aliphatic polyesters are molded and worked in any suitable methods, and their moldings are used, for example, as parts for writing materials such as ball-point pens, automatic pencils, pencils and others, parts for stationery, golf tees, parts for smoke golf balls for first ball shooting ceremonies, capsules for oral medicines, carriers for anal and vaginal suppositories, carriers for plasters to the skin and mucous membranes, capsules for agricultural chemicals, capsules for fertilizers, capsules for seeds and seedlings, composts, reels for fishing lines, floats for fishing, decoys for fishing, lures, buoys for fishing, decoys for hunting, capsules for hunting shots, camping goods such as dishes and others, nails, piles, binders, nonskid materials for muddy places and snow roads, blocks, lunch boxes, tableware, containers for packed lunches and everyday dishes such as those sold in convenience stores, chopsticks, half-split disposable chopsticks, folks, spoons, skewers, toothpicks, cups for cupped instant noodles, cups for automatic drink machines, containers and trays for foods such as fishes, meats, vegetables, bean-curd cakes, everyday dishes and others, fish boxes to be used in fish markets, bottles for milk products such as milk, yogurt, lactic acid drinks and others, bottles for alcohol drinks such as beer, whisky and others, pumping or non-pumping bottles for shampoo and liquid soap, tubes for toothpaste, containers for cosmetics, containers for detergents, containers for bleaching agents, cooling boxes, flowerpots, casings for water-purifying cartridges, casings for artificial kidneys, artificial livers and others, parts for syringes, buffers to be used for transporting domestic electrical appliances such as TVs, stereo record players and others, buffers to be used for transporting precision instruments such as computers, printers, clocks and others, buffers to be used for transporting ceramic products such as glassware, earthenware, etc.

EXAMPLES

The invention is described in detail with reference to the following Examples. Examples are to support the good understanding of the contents of the invention and are not intended to restrict the technical scope of the invention.

Methods for Measuring Physical Properties of Samples in

The methods as employed in Examples for measuring the physical properties of samples are as follow:

(1) Weight-Average Molecular Weight:

The weight-average molecular weight (Mw) of the oligomer, prepolymer and polyester polymer obtained was measured through gel permeation chromatography (at a column temperature of 40° C., using chloroform as the solvent), while being compared with the molecular weight of a standard sample of polystyrene.

(2) Optical Purity of Lactic Acid Component:

Preparation of Sample:

One gram of a polymer sample (powdered in a mortar when it was solid) was weighed out and put into a 50 ml Erlenmeyer flask, to which were added 2.5 ml of isopropyl alcohol and 5 ml of 5 N NaOH, and hydrolyzed while being stirred on a hot plate at 40° C. After the sample was degraded and completely dissolved, the resulting solution was cooled to room temperature, and neutralized with 20ml of 1 N HCl added thereto. One ml of the thus-degraded and neutralized solution was put into a 25 ml volumetric flask, then diluted to the mark with a liquid mobile phase for HPLC having the composition mentioned below, and subjected to HPLC according the condition mentioned below, from which was obtained the peak area ratio of D/L forms of lactic acid.

Condition for Measurement:

Column: SUMICHIRAL OA-5000 (from Analytical Center of Sumitomo Chemical).

Mobile phase: 1 mM $CuSO_4$ aqueous solution/isopropyl alcohol=98/2.

Flow rate: 1 ml/min.

Wavelength for detection: 254 nm.

Temperature: room temperature.

Amount of sample charged: 5 µl.

(3) Measurement of Water Content of Solvent:

A Curlfisher water content meter (MKC-210, from Kyoto Electronic Industry) was used for the measurement.

(4) Differential Calorimetry:

A differential scanning calorimeter (DSC-3100 from Mac Science) was used for the measurement, for which the temperature range was between −20° C. and 23° C.

(5) Tensile Strength:

A film sample as formed through hot pressing at 180° C. was tested for its tensile strength, according to JIS K-6732.

(6) Haze:

A film sample with a thickness of 100 µm as formed through hot pressing at 180° C. was tested for its haze, according to JIS K-6714, for which was used a haze meter, TC-HIII (from Tokyo Denshoku).

(7) Yellowness (YI value):

A plate sample (thickness: 2 mm) was formed, and the yellowness thereof was measured according to JIS K-7103, for which was used an SM color computer (Model of SM-6-IS-2B from Suga Testers).

(8) Catalyst Concentration in Aliphatic Polyester (in terms of sulfur content):

The catalyst concentration in aliphatic polyester (in terms of sulfur content) was determined through ion chromatography.

Precisely, a aliphatic polyester sample was heated up to 900° C. and ashed in a closed system ($Ar/O_2$), whereupon the gas generated was absorbed by a predetermined amount of an absorbent liquid (1% $H_2O_2$ solution), and analyzed through ion chromatography.

For ion chromatography, used was Dionex's Ion Chromato DX-300 Model.

(9) Residual Percentage of Catalyst (R):

The residual percentage of catalyst (R) in products was calculated according to the numerical formula defined herein. However, for the catalyst concentration $C_A$ in the aliphatic polyester as finally obtained after dehydrating polycondensation, the amount of the catalyst of various organic sulfonic acid compounds used in Examples was derived from the sulfur content as determined in (8).

In the following Examples, the catalyst concentration, $C_A$, in the aliphatic polyester as finally obtained after dehydrating polycondensation, and the theoretical catalyst concentration, $C_B$, in the case where all the catalyst as fed into the reaction system for dehydrating polycondensation is to remain in the final product, aliphatic polyester, are referred to in a simplified manner as catalyst concentration $C_A$, and catalyst concentration $C_B$, respectively.

(10) Retentiveness of Weight-Average Molecular Weight in Pressing:

The retentiveness of weight-average molecular weight of an aliphatic polyester sample in pressing is represented by a ratio of the weight-average molecular weight of the sample not formed into a press film to that of a hot-pressed film of the sample as formed under hot pressure at 190° C. Precisely, to prepare its hot-pressed film, an aliphatic polyester having been obtained after dehydrating polycondensation was dried in vacuum at 60° C. for 5 hours, and pressed under heat into a film having a thickness of 100 μm. In the hot pressing operation, the aliphatic polyester was kept heated at 190° C. for 3 minutes and then pressed under a pressure of 10 MPa for 1 minute at the same temperature of 190° C., or that is, the aliphatic polyester being formed into the film was kept heated at the temperature of 190° C. for a total of 4 minutes.

(11) Flexural Strength:

An aliphatic polyester sample was injection-molded at a temperature falling between 180 and 200° C. into a molding having a predetermined shape, which was then tested for its flexural strength according to JIS K-7113.

(12) Melt Tension (MT):

An aliphatic polyester sample was tested at predetermined two temperatures for its melt flow index under a load of 2160 g. In the temperature-dependent melt index curve as plotted, the temperature at which the melt flow index is 10 g/10 min was read. The melt tension at the thus-read temperature of the sample was measured.

(13) Degradability:

An aliphatic polyester film sample as formed through hot pressing at 180° C. was embedded in compost at room temperature for 30 days, and the tensile strength of the film sample was measured before and after the embedding in compost. The degradability of the aliphatic polyester sample was evaluated from the data thus measured.

Part A, Production of Aliphatic Hydroxycarboxylic Acid Prepolymers

Example A-1

400 g of 90% L-lactic acid (D-form content: 0.40%) and 0.28 g of metal tin powder were fed into a 500 ml, four-neck glass flask, then purged with nitrogen, and thereafter heated from room temperature up to 120° C. under a reduced pressure of 80 mmHg. At about 60° C., water formed in the reaction began to vaporize out, and this stage was for the starting time of 0 hour. Within a period of 1 hour from the starting time, the reaction system was heated up to 120° C. After having reached 120° C., this was kept as it was for further one hour under the settled reduced pressure of 80 mmHg. Next, the degree of the reduced pressure was varied from 80 mmHg to 10 mmHg over a period of 30 minutes still at 120° C., and thereafter the reaction system was kept under the varied condition for 3 hours. After the total of 5 hours and 30 minutes in this process, the weight-average molecular weight (Mw) of the prepolymer formed was 1500, and the D-form content thereof was 0.41%.

Next, the reaction system was further heated from 120° C. up to 160° C. over a period of 1 hour still under the reduced pressure of 10 mmHg, and the dehydrating condensation in the system was further continued under the condition of 10 mmHg and 160° C. After 10 hours under the condition of 10 mmHg and 160° C. (16 hours and 30 minutes in total), the reaction was stopped. In the process, obtained was 273 g of a polymer (yield: 95%).

The polylactic acid obtained herein had Mw of 13000 and a D-form content of 0.65%.

Example A-2

The same process as in Example A-1 was repeated, except that 1.16 g of methanesulfonic acid was used as the catalyst.

Analyzing the reaction mixture after 5 hours and 30 minutes gave data of Mw of 1400 and D-form content of 0.41%. The polylactic acid as obtained after 16 hours and 30 minutes weighed 272 g (yield: 94%), and had Mw of 14000 and a D-form content of 0.67%.

Example A-3

The same process as in Example A-1 was repeated, except that 1.74 g of p-toluenesulfonic acid monohydrate was used as the catalyst.

Analyzing the reaction mixture after 5 hours and 30 minutes gave data of Mw of 1800 and D-form content of 0.41%. The polylactic acid as obtained after 16 hours and 30 minutes weighed 273 g (yield: 95%), and had Mw of 15000 and a D-form content of 0.65%.

Comparative Example A-1

400 g of 90% L-lactic acid (D-form content: 0.40%) and 0.28 g of metal tin powder were fed into a 500 ml, four-neck glass flask, then purged with nitrogen, and thereafter heated from room temperature up to 160° C. under a reduced pressure of 80 mmHg. At about 60° C., water formed in the reaction began to vaporize out, and this stage was for the starting time of 0 hour. Within a period of 1 hour from the starting time, the reaction system was heated up to 160° C. In this stage, the weight-average molecular weight of the reaction product was at most 500. After having reached 160° C., the reaction system was kept as it was for further one hour under the settled reduced pressure of 80 mmHg. Next, the degree of the reduced pressure was varied from 80 mmHg to 10 mmHg over a period of 30 minutes still at 160° C., and thereafter the reaction system was kept under the varied condition for 8 hours. After the total of 10 hours and 30 minutes in this process, the weight of the polymer formed was 264 g (yield: 92%), the weight-average molecular weight (Mw) thereof was 15000, and the D-form content thereof was 1.21%. As compared with the process in Example A-1, the process herein gave, within a shorter period of time, a polymer having nearly the same molecular weight as that of the polymer obtained in Example A-1. However, regarding the degree of change into D-form, the increase in D-form in Example A-1 was 0.21%, but that in this Comparative Example A-1 was 0.81%. That is, the D-form content of the polymer obtained in Comparative Example A-1 was more than 3 times that of the starting monomer.

Comparative Example A-2

The same process as in Comparative Example A-1 was repeated, except that 1.16 g of methanesulfonic acid was used as the catalyst. The product in the stage in which the reaction temperature reached 160° C. had Mw of at most 500.

The polylactic acid as obtained after 10 hours and 30 minutes weighed 265 g (yield: 92%, and had Mw of 15000 and a D-form content of 1.29%.

Comparative Example A-3

The same process as in Comparative Example A-1 was repeated, except that 1.74 g of p-toluenesulfonic acid monohydrate was used as the catalyst. The product in the stage in which the reaction temperature reached 160° C. had Mw of at most 500.

The polylactic acid as obtained after 10 hours and 30 minutes weighed 265 g (yield: 92%), and had Mw of 16000 and a D-form content of 1.31%.

Part B, Crystallization of Aliphatic Hydroxycarboxylic Acid Prepolymers

Example B-1

1070 g of 90% L-lactic acid and 0.75 g of tin were fed into a 2000 ml, round-bottom glass flask, then purged with nitrogen, and thereafter gradually heated, with the pressure therein being gradually reduced. Finally, the reaction temperature was 160° C. and the reaction pressure was 10 Torr. Under the condition, the reaction was continued for 15 hours. The polylactic acid thus obtained had a relative viscosity, $\eta$inh, of 0.29.

The polylactic acid was pelletized into pellets having a size of rice grains. 20 g of the pellets were put into 80 g of water at 50° C., and left therein for 60 minutes. In that condition, the pellets were neither fused together nor broken. The pellets were taken out, dried at room temperature under reduced pressure, and subjected to differential scanning calorimetry, in which heat of crystallization was not detected.

Example B-2

20 g of the polylactic acid as prepared in Example A-1 was, while it was molten, dropwise added to 80 g of water at 50° C. with stirring. Immediately after having been in water, the polymer was solidified into particles therein. The polymer particles in water were kept as such for 60 minutes. In that condition, the particles were neither fused together nor broken. The particles were taken out, dried at room temperature under reduced pressure, and subjected to differential scanning calorimetry, in which heat of crystallization was not detected.

Example B-3

10 g of dichlorobenzene was added to 20 g of the polylactic acid that had been obtained in Example A-1 to prepare a solution of the polylactic acid. This polylactic acid solution was dropwise added to 270 g of water at 50° C. with stirring. Immediately after having been in water, the polymer was solidified into particles therein. The polymer particles in water were kept as such for 60 minutes. In that condition, the particles were neither fused together nor broken. The particles were taken out, dried at room temperature under reduced pressure, and subjected to differential scanning calorimetry, in which heat of crystallization was not detected.

Comparative Example B-1

The polylactic acid pellets having been prepared in Example A-1 were put into an oven at 50° C. for crystallization. However, even after 60 minutes, the pellets were still transparent. Differential scanning calorimetry of the pellets developed heat of crystallization of 40 J/g.

On the other hand, the polylactic acid pellets as prepared in Example A-1 were put into an oven at 60° C. for crystallization. After 30 minutes, however, the pellets were fused together.

Part C, Solid-Phase Polymerization by using volatile catalyst

Example C-1

(1) First Step (for First-stage Dehydrating Polycondensation (polymerization for prepolymer)):

A prepolymer was prepared under the condition mentioned below. The prepolymer had a weight-average molecular weight (Mw) of 13,000.

Reaction Condition:

Monomer: 88% L-lactic acid, 400.0 g.

Volatile catalyst: p-toluenesulfonic acid monohydrate, 3.11 g.

Reactor: 500 ml round-bottom flask.

Reaction temperature and reaction time (reaction pressure, reaction atmosphere):The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 8 hours (under the reduced pressure of 10 mmHg).

(2) Second Step (for solidification of prepolymer):

The gross weight of the round-bottom flask was measured, from which was derived the yield of the prepolymer formed. The yield was 267.5 g, and was 95.0%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 40 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.75 g of an aliphatic polyester (polylactic acid). The yield was 95.0%.

The dew point of the nitrogen gas used herein was −60° C.

The characteristics of the aliphatic polyester as obtained after the solid-phase polymerization are as follows:

Weight-average molecular weight (Mw)=146,000.
Catalyst concentration, $C_A$=751 ppm (sulfur content, 140 ppm).
Catalyst concentration, $C_B$=11000 ppm.
Residual percentage of catalyst, R=6.8%.
Molecular weight retentiveness in pressing=94%.

Example C-2

(1) First Step (for first-stage dehydrating polycondensation (polymerization for prepolymer)):

A prepolymer was prepared under the condition mentioned below. The prepolymer had a weight-average molecular weight (Mw) of 13,000.

Reaction Condition:
Monomer: 88% L-lactic acid, 400.0 g.
Volatile catalyst: methanesulfonic acid, 2.82 g.
Reactor: 500 ml round-bottom flask.

Reaction temperature and reaction time (reaction pressure, reaction atmosphere): The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 8 hours (under the reduced pressure of 10 mmHg).

(2) Second Step (for solidification of prepolymer):

The gross weight of the round-bottom flask was measured, from which was derived the yield of the prepolymer formed. The yield was 268.4 g, and was 95.3%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 40 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.75 g of an aliphatic polyester (polylactic acid). The yield was 95.0%.

The dew point of the nitrogen gas used herein was −60° C.

The characteristics of the aliphatic polyester as obtained after the solid-phase polymerization are as follows:

Weight-average molecular weight (Mw)=133,000.
Catalyst concentration, $C_A$=329 ppm (sulfur content, 110 ppm).
Catalyst concentration, $C_B$=11100 ppm.
Residual percentage of catalyst, R=3.0%.
Molecular weight retentiveness in pressing=92%.

Example C-3

(1) First Step (for first-stage dehydrating polycondensation (polymerization for prepolymer)):

A prepolymer was prepared under the condition mentioned below. The prepolymer had a weight-average molecular weight (Mw) of 13,000.

Reaction Condition:
Monomer: 88% L-lactic acid, 400.0 g.
Volatile catalyst: Ethanesulfonic acid, 2.82 g.
Reactor: 500 ml round-bottom flask.

Reaction temperature and reaction time (reaction pressure, reaction atmosphere): The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 8 hours (under the reduced pressure of 10 mmHg).

(2) Second Step (for solidification of prepolymer):

The gross weight of the round-bottom flask was measured, from which was derived the yield of the prepolymer formed. The yield was 266.7 g, and was 94.7%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 40 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.78 g of an aliphatic polyester (polylactic acid). The yield was 95.6%.

The dew point of the nitrogen gas used herein was −60° C.

The characteristics of the aliphatic polyester as obtained after the solid-phase polymerization are as follows:

Weight-average molecular weight (Mw)=130,000.

Catalyst concentration, $C_A$=377 ppm (sulfur content, 110 ppm).

Catalyst concentration, $C_B$=11100 ppm.

Residual percentage of catalyst, R=3.4%.

Molecular weight retentiveness in pressing =92%.

Example C-4

(1) First Step (for first-stage dehydrating polycondensation (polymerization for prepolymer)):

A prepolymer was prepared under the condition mentioned below. The prepolymer had a weight-average molecular weight (Mw) of 12,000.

Reaction Condition:

Monomer: 88% L-lactic acid, 400.0 g.

Volatile catalyst: 1-propane sulfonic acid, 2.82 g.

Reactor: 500 ml round-bottom flask.

Reaction temperature and reaction time (reaction pressure, reaction atmosphere): The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 8 hours (under the reduced pressure of 10 mmHg).

(2) Second Step (for solidification of prepolymer):

The gross weight of the round-bottom flask was measured, from which was derived the yield of the prepolymer formed. The yield was 264.1 g, and was 93.8%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 40 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.76 g of an aliphatic polyester (polylactic acid). The yield was 95.2%.

The dew point of the nitrogen gas used herein was −60° C.

The characteristics of the aliphatic polyester as obtained after the solid-phase polymerization are as follows:

Weight-average molecular weight (Mw)=130,000.

Catalyst concentration, $C_A$=387 ppm (sulfur content, 100 ppm).

Catalyst concentration, $C_B$=11200 ppm.

Residual percentage of catalyst, R=3.5%.

Molecular weight retentiveness in pressing =93%.

Example C-5

(1) First Step (for first-stage dehydrating polycondensation (polymerization for prepolymer)):

A prepolymer was prepared under the condition mentioned below. The prepolymer had a weight-average molecular weight (Mw) of 12,000.

Reaction Condition:

Monomer: 88% L-lactic acid, 400.0 g.

Volatile catalyst: p-chlorobenzenesulfonic acid, 1.69 g.

Reactor: 500 ml round-bottom flask.

Reaction temperature and reaction time (reaction pressure, reaction atmosphere): The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 10 hours (under the reduced pressure of 10 mmHg).

(2) Second Step (for solidification of prepolymer):

The gross weight of the round-bottom flask was measured, from which was derived the yield of the prepolymer formed. The yield was 265.3 g, and was 94.2%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 60 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.74 g of an aliphatic polyester (polylactic acid). The yield was 94.8%.

The dew point of the nitrogen gas used herein was −60° C.

The characteristics of the aliphatic polyester as obtained after the solid-phase polymerization are as follows:

Weight-average molecular weight (Mw)=138,000.

Catalyst concentration, $C_A$=840 ppm (sulfur content, 140 ppm).

Catalyst concentration, $C_B$=6720 ppm.

Residual percentage of catalyst, R=12.5%.

Molecular weight retentiveness in pressing 90%.

Example C-6

(1) First Step (for first-stage dehydrating polycondensation (polymerization for prepolymer)):

A prepolymer was prepared in a three-stage process under the condition mentioned below. The prepolymer had a weight-average molecular weight (Mw) of 20,000.

Reaction Condition:

Monomer: 88% L-lactic acid, 102.3 g.

Volatile catalyst: p-toluenesulfonic acid monohydrate, 0.80

First stage:
Reactor: 500 ml round-bottom flask.
Reaction temperature: 140° C.
Reaction pressure: 100 mmHg.
Reaction time: 3 hours.
Operation: The reaction system was stirred under heat with water formed being removed out of the system through vaporization.

Second stage:
Reactor: A Dean Stark trap was fitted to the 500 ml round-bottom flask.
Reaction temperature: 140° C.
Reaction pressure: 270 mmHg.
Reaction time: 4 hours.
Operation: With both the Dean Stark trap and the reaction mass being charged with 72 g of o-dichlorobenzene, the reaction system was subjected to azeotropic dehydration for 4 hours.

Third stage:
Reactor: The Dean Stark trap was detached, and a molecular sieve-charged duct was attached to the 500 ml round-bottom flask. The organic solvent (o-dichlorobenzene) being refluxed in the flask was run through the molecular sieve-charged layer (this was charged with 30 g of Molecular Sieve 3A), and recirculated into the flask.
Reaction temperature: 140° C.
Reaction pressure: 270 mmHg.
Reaction time: 8 hours.
Operation: The molecular sieve-charged duct was filled with 54 g of o-dichlorobenzene having a water content of 10 ppm, and the reaction mass with 144 g of o-dichlorobenzene. The organic solvent, o-dichlorobenzene being refluxed in the flask was run through the molecular sieve-charged duct, and recirculated into the flask. In that condition, the reaction system was stirred under heat in the flask.

(2) Second Step (for solidification of prepolymer):

The reaction liquid was cooled to 30° C. to give a precipitate. Then, o-dichlorobenzene was removed through vaporization at 60° C. under 10 mmHg, and the residue was dried in a nitrogen atmosphere. Thus was obtained 67.6 g of a powdery prepolymer, and its yield was 93.9%.

Using a melt indexer, the powdery prepolymer was formed into strands, which were then pelletized and sieved. Thus were obtained pellets of the prepolymer, having a size of from 0.5 to 2.0 mm.

(3) Third Step (for crystallization of prepolymer):

5.00 g of the prepolymer pellets were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 40 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.77 g of an aliphatic polyester (polylactic acid). The yield was 95.4%.

The dew point of the nitrogen gas used herein was −60° C.

The characteristics of the aliphatic polyester as obtained after the solid-phase polymerization are as follows:

Weight-average molecular weight (Mw)=143,000.

Catalyst concentration, $C_A$=751 ppm (sulfur content, 140 ppm).

Catalyst concentration, $C_B$=11200 ppm.

Residual percentage of catalyst, R=6.7%.

Molecular weight retentiveness in pressing =94%.

Example C-7

(1) First Step (for first-stage dehydrating polycondensation (polymerization for prepolymer)):

A prepolymer was prepared under the condition mentioned below. The prepolymer had a weight-average molecular weight (Mw) of 12,000.

Reaction Condition:

Monomer: 88% L-lactic acid, 400.0 g.

Volatile catalyst: benzenesulfonic acid monohydrate, 1.88 g.

Reactor: 500 ml round-bottom flask.

Reaction temperature and reaction time (reaction pressure, reaction atmosphere): The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 10 hours (under the reduced pressure of 10 mmHg).

(2) Second Step (for solidification of prepolymer):

The gross weight of the round-bottom flask was measured, from which was derived the yield of the prepolymer formed. The yield was 265.3 g, and was 94.2%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to the following two-stage solid-phase polymerization in the same vertical SUS reactor.

First Stage: solid-phase polymerization, for which the reaction pressure was 760 mmHg, the reaction temperature was 140° C., the flowing gas was nitrogen gas, the flow rate of the flowing gas was 5 ml/min, and the reaction time was 60 hours.

Second Stage: solid-phase polymerization, for which the reaction pressure was 760 mmHg, the reaction temperature was 160° C., the flowing gas was nitrogen gas, the flow rate of the flowing gas was 200 ml/min, and the reaction time was 60 hours.

In the process, obtained was 4.75 g of an aliphatic polyester (polylactic acid). The yield was 95.0%.

The dew point of the nitrogen gas used herein was −60° C.

The characteristics of the aliphatic polyester as obtained after the solid-phase polymerization are as follows:

Weight-average molecular weight (Mw)=129,000.

Catalyst concentration, $C_A$=690 ppm (sulfur content, 140 ppm).

Catalyst concentration, $C_B$=6710 ppm.

Residual percentage of catalyst, R=10.3%.

Molecular weight retentiveness in pressing =91%.

Comparative Example C-1

(1) First Step (for first-stage dehydrating polycondensation (polymerization for prepolymer)):

A prepolymer was prepared in a five-stage process under the condition mentioned below. As the catalyst, herein used was tin which is known as an esterification catalyst with high activity. The prepolymer had a weight-average molecular weight (Mw) of 12,000.

Reaction Condition:

Monomer: 88% L-lactic acid, 400.0 g.

Volatile catalyst: tin powder, 0.28 g.

Reactor: 500 ml round-bottom flask.

Reaction temperature and reaction time (reaction pressure, reaction atmosphere): The reaction process comprised the following five stages.

First stage: Heating the reaction system from 25° C. up to 100° C. over a period of 30 minutes (under atmospheric pressure in nitrogen).

Second stage: Heating it from 100° C. up to 160° C. over a period of 1 hour (under atmospheric pressure in nitrogen).

Third stage: Keeping it at 160° C. for 1 hour (under atmospheric pressure in nitrogen).

Fourth stage: Keeping it at 160° C. for 2 hours (with the nitrogen atmosphere being reduced to 10 mmHg).

Fifth stage: Still keeping it at 160° C. for 6 hours (under the reduced pressure of 10 mmHg).

(2) Second Step (for solidification of prepolymer):

The gross weight of the round-bottom flask was measured, from which was derived the yield of the prepolymer formed. The yield was 267.5 g, and was 95.0%. The reaction liquid was poured into an enamel vat, and cooled to 30° C. Then, the resulting prepolymer was ground in a mortar, and sieved. Thus were obtained particles of the prepolymer, having a particle size of from 0.5 to 2.0 mm.

(3) Third Step (for crystallization of prepolymer):

5.00 g of the prepolymer particles were charged into a vertical reactor of SUS (stainless steel), and crystallized therein in a nitrogen atmosphere at 80° C. for 1 hour.

(4) Fourth Step (for second-stage dehydrating polycondensation (solid-phase polymerization)):

Following the third step, the crystallized prepolymer was subjected to solid-phase polymerization in the same vertical SUS reactor, for which the reaction pressure was 760 mmHg, the reaction temperature was 140° C., the flowing gas was nitrogen gas, the flow rate of the flowing gas was 200 ml/min, and the reaction time was 60 hours. In the process, obtained was 4.46 g of an aliphatic polyester (polylactic acid). The yield was 89.2%.

The dew point of the nitrogen gas used herein was −60° C.

The characteristics of the aliphatic polyester as obtained after the solid-phase polymerization are mentioned below. The catalyst concentration (tin concentration) was determined through fluorescent X-ray analysis.

Weight-average molecular weight (Mw)=132,000.

Catalyst concentration (tin concentration), $C_A$=1200 ppm.

Catalyst concentration (tin concentration), $C_B$=1200 ppm.

Residual percentage of catalyst, R=100%.

Molecular weight retentiveness in pressing=38%.

The data obtained in Examples C-1 to C-7 and Comparative Example C-1 are in Table 1.

TABLE 1

| | | Example C-1 | Example C-2 | Example C-3 | Example C-4 |
|---|---|---|---|---|---|
| volatile catalyst | | p-toluenesulfonic acid monohydrate | methanesulfonic acid | ethanesulfonic acid | 1-propanesulfonic acid |
| weight (g) | | 3.11 | 2.82 | 2.82 | 2.82 |
| Solid phase polymerization | Reaction pressure (mmHg) | 760 | 760 | 760 | 760 |
| | Reaction temperature (° C.) | 140→160 | 140→160 | 140→160 | 140→160 |
| | Reaction time (hr) | 40 + 60 | 40 + 60 | 40 + 60 | 40 + 60 |
| | Gas flow rate (ml/min) | 5→200 | 5→200 | 5→200 | 5→200 |
| | Particle size (mm) | 0.5–2 | 0.5–2 | 0.5–2 | 0.5–2 |
| Mw of prepolymer | | 13,300 | 13,000 | 13,000 | 12,000 |
| Mw of polyester | | 146,000 | 133,000 | 130,000 | 130,000 |
| Catalyst concentration | | 751 | 329 | 377 | 387 |

TABLE 1-continued

| | | | | |
|---|---|---|---|---|
| $C_A$ (ppm) | | | | |
| Residual percentage of catalyst R (%) | 6.8 | 3.0 | 3.4 | 3.5 |
| Molecular weight retentiveness in pressing (%) | 94 | 92 | 92 | 93 |

| | | Example C-5 | Example C-6 | Example C-7 | Comp. Example C-1 |
|---|---|---|---|---|---|
| Volatile catalyst | | p-chlorobenzene sulfonic acid | p-toluene sulfonic acid monohydrate | benzenesulfonic acid monohydrate | tin powder |
| weight (g) | | 1.69 | 0.8 | 1.88 | 0.28 |
| Solid phase polymerization | Reaction pressure (mmHg) | 760 | 760 | 760 | 760 |
| | Reaction temperature (° C.) | 140→160 | 140→160 | 140→160 | 140→160 |
| | Reaction time (hr) | 60 + 60 | 40 + 60 | 60 + 60 | 60 |
| | Gas flow rate (ml/min) | 5→200 | 5→200 | 5→200 | 200 |
| | Particle size (mm) | 0.5–2 | 0.5–2 | 0.5–2 | 0.5–2 |
| Mw of prepolymer | | 12,000 | 20,000 | 12,000 | 12,000 |
| Mw of polyester | | 138,000 | 143,000 | 129,000 | 132,000 |
| Catalyst concentration $C_A$ (ppm) | | 840 | 751 | 690 | 1200 |
| Residual percentage of catalyst R (%) | | 12.5 | 6.7 | 10.3 | 100 |
| Molecular weight retentiveness in pressing (%) | | 90 | 94 | 91 | 38 |

Part C', Solid-Phase Polymerization by using nonvolatile catalyst:

Example C'-1

102.3 g of 88% L-lactic acid and 0.41 g of tin(II) oxide were fed into a 500 ml round-bottom flask, and stirred under heat at 140° C./100 mmHg for 3 hours with water formed being removed out of the system through vaporization. Next, a Dean Stark trap charged with 72 g of o-dichlorobenzene was attached to the flask, 72.0 g of o-dichlorobenzene was added to the reaction mass, and the system was subjected to azeotropic dehydration at 140° C./270 mmHg for 4 hours. Then, the Dean Stark trap was detached, and a duct filled with 30 g of Molecular Sieve 3A, to which had been added 54 g of o-dichlorobenzene having a water content of at most 10 ppm, was attached to the flask in such a manner that the solvent being refluxed in the flask could run through the molecular sieve-charged duct and could be recirculated into the flask. In that condition, 144 g of o-dichlorobenzene was added to the reaction mass, and the system was further stirred under heat at 140° C./270 mmHg for 8 hours with water formed being prevented from entering the system. The prepolymer formed in this stage had a molecular weight of 66,000.

After this, the reaction liquid was cooled to 30° C. thereby precipitating the prepolymer therein, and o-dichlorobenzene was removed through vaporization at 60° C./10 mmHg. Then, the resulting prepolymer was dried in a nitrogen atmosphere to be powdery.

The thus-obtained prepolymer was put into a 500 ml, egg-plant type flask, and heated at 140° C./2 mmHg for 13 hours. Next, 800 ml of a solution of 0.7% HCl/isopropyl alcohol was added thereto, stirred for 1 hour, and filtered under suction. This treatment was repeated twice to remove tin. Next, the resulting residue was stirred in 600 ml of isopropyl alcohol, and filtered under suction. This treatment was repeated until the filtrate became neutral. The resulting residue was dried with hot air at 60° C. to obtain 67.0 g (yield: 93.1%) of an aliphatic polyester polymer (polylactic acid).

The physical properties of the polymer are mentioned below.

Weight-average molecular weight: 133,000.

Differential calorimetry: The glass transition point was 58.5° C., and the melting point was 163.4° C.

Tensile strength: 620 kg/cm² (at break).

Haze: <1%.

Degradability: Films of the polymer were degraded to such a degree that their strength could not be measured.

Example C'-2

102.3 g of 88% L-lactic acid and 0.36 g of tin powder were fed into a 500 ml round-bottom flask, and stirred under heat at 140° C./100 mmHg for 3 hours with water formed being removed out of the system through vaporization. Next, a Dean Stark trap charged with 72 g of o-dichlorobenzene was attached to the flask, 72.0 g of o-dichlorobenzene was added to the reaction mass, and the system was subjected to azeotropic dehydration at 140° C./270 mmHg for 4 hours. Then, the Dean Stark trap was detached, and a duct filled with 30 g of Molecular Sieve 3A, to which had been added 72 g of o-dichlorobenzene having a water content of at most 10 ppm, was attached to the flask in such a manner that the solvent being refluxed in the flask could run through the molecular sieve-charged duct and could be recirculated into the flask. In that condition, 144 g of o-dichlorobenzene was added to the reaction mass, and the system was further stirred under heat at 140° C./270 mmHg for 8 hours with water formed being prevented from entering the system. The prepolymer formed in this stage had a molecular weight of 22,000.

After this, the reaction liquid was cooled to 30° C. thereby precipitating the prepolymer therein, and o-dichlorobenzene was removed through vaporization at 60° C./10 mmHg. Then, the resulting prepolymer was dried in a nitrogen atmosphere to be powdery.

The thus-obtained prepolymer was put into a 500 ml, egg-plant type flask, and heated at 140° C./2 mmHg for 21 hours. Next, 800 ml of a solution of 0.7% HCl/isopropyl alcohol was added thereto, stirred for 1 hour, and filtered under suction. This treatment was repeated twice to remove tin. Next, the resulting residue was stirred in 600 ml of isopropyl alcohol, and filtered under suction. This treatment was repeated until the filtrate became neutral. The resulting residue was dried with hot air at 60° C. to obtain 65.0 g (yield: 90.6%) of an aliphatic polyester polymer (polylactic acid).

The physical properties of the polymer are mentioned below.

Weight-average molecular weight: 122,000.

Differential calorimetry: The glass transition point was 57.9° C., and the melting point was 162.0° C.

Tensile strength: 600 kg/cm$^2$ (at break).

Haze: <1%.

Degradability: Films of the polymer were degraded to such a degree that their strength could not be measured.

Example C'-3

102.3 g of 88% L-lactic acid and 0.80 g of paratoluenesulfonic acid monohydrate were fed into a 500 ml round-bottom flask, and stirred under heat at 140° C./100 mmHg for 1.5 hours with water formed being removed out of the system through vaporization. Next, a Dean Stark trap charged with 72 g of o-dichlorobenzene was attached to the flask, 72.0 g of o-dichlorobenzene was added to the reaction mass, and the system was subjected to azeotropic dehydration at 140° C./270 mmHg for 6 hours. Then, the Dean Stark trap was detached, and a duct filled with 30 g of Molecular Sieve 3A, to which had been added 54 g of o-dichlorobenzene having a water content of at most 10 ppm, was attached to the flask in such a manner that the solvent being refluxed in the flask could run through the molecular sieve-charged duct and could be recirculated into the flask. In that condition, 144 g of o-dichlorobenzene was added to the reaction mass, and the system was further stirred under heat at 140C/270 mmHg for 8 hours with water formed being prevented from entering the system. The prepolymer formed in this stage had a molecular weight of 24,000.

After this, the reaction liquid was cooled to 30° C. thereby precipitating the prepolymer therein, and o-dichlorobenzene was removed through vaporization at 60° C./10 mmHg. Then, the resulting prepolymer was dried in a nitrogen atmosphere to be powdery.

The thus-obtained prepolymer was put into a 500 ml, egg-plant type flask, and heated at 140° C./2 mmHg for 38 hours. Next, the resulting polymer was dissolved in 430 ml of chloroform and contacted with 430 ml of water to remove the catalyst therefrom. The chloroform solution containing the polymer formed was poured into 1500 ml of isopropyl alcohol, thereby precipitating the polymer therein. The resulting residue was collected through filtration under suction, and dried with hot air at 60° C. to obtain 58.3 g (yield: 81.0%) of an aliphatic polyester polymer (polylactic acid).

The physical properties of the polymer are mentioned below.

Weight-average molecular weight: 132,000.

Differential calorimetry: The glass transition point was 58° C. and the melting point was 163.0° C.

Tensile strength: 620 kg/cm$^2$ (at break).

Haze: <1%.

Degradability: Films of the polymer were degraded to such a degree that their strength could not be measured.

Example C'-4

102.3 g of 88% L-lactic acid and 1.44 g of methanesulfonic acid were fed into a 500 ml round-bottom flask.

Then, the system was heated from room temperature up to 160° C. over a period of 1 hour in a nitrogen atmosphere under normal pressure, and kept at 160° C. for 1 hour, and the normal pressure of the system was gradually lowered to 10 mmHg over a period of 2 hours still at 160° C. Finally, the reaction was continued at 160° C./10 mmHg for 6 hours. The prepolymer formed in this stage had a molecular weight of 7,000.

After this, the reaction liquid was poured into an enamel vat, and cooled to 30° C. Then, the resulting prepolymer was ground in a mortar to be granular.

The prepolymer was put into a U-shaped glass tube, and heated at 140° C. in a nitrogen atmosphere for 40 hours to obtain 66.5 g (yield: 92.3%)) of an aliphatic polyester polymer (polylactic acid).

The physical properties of the polymer are mentioned below.

Weight-average molecular weight: 90,000.

Differential calorimetry: The glass transition point was 56.5° C., and the melting point was 160.0° C.

Tensile strength: 580 kg/cm$^2$ (at break).

Haze: <1%.

Degradability: Films of the polymer were degraded to such a degree that their strength could not be measured.

Example C'-5

102.3 g of 88% L-lactic acid and 0.41 g of stannous oxide were fed into a 500 ml round-bottom flask, and stirred under heat at 140° C./100 mmHg for 3 hours with water formed being removed out of the system through vaporization. Next, a Dean Stark trap charged with 72 g of o-dichlorobenzene was attached to the flask, 72.0 g of o-dichlorobenzene was added to the reaction mass, and the system was subjected to azeotropic dehydration at 140° C./270mmHg for 4 hours. Then, the Dean Stark trap was detached, and a duct filled with 30 g of Molecular Sieve 3A, to which had been added 54 g of o-dichlorobenzene having a water content of at most 10 ppm, was attached to the flask in such a manner that the solvent being refluxed in the flask could run through the molecular sieve-charged duct and could be recirculated into the flask. In that condition, 144 g of o-dichlorobenzene was added to the reaction mass, and the system was further stirred under heat at 140° C./270 mmHg for 8 hours with water formed being prevented from entering the system. The prepolymer formed in this stage had a molecular weight of 68,000.

After this, the reaction liquid was cooled to 30° C. thereby precipitating the prepolymer therein, and o-dichlorobenzene was removed through vaporization at 60° C./10 mmHg. Then, the resulting prepolymer was dried in a nitrogen atmosphere to be powdery. Using a melt indexer, the powdery prepolymer was formed into strands, which were then pelletized into pellets of the prepolymer.

The thus-obtained prepolymer was put into a 500 ml, egg-plant type flask, and heated at 140° C./2 mmHg for 24 hours.

Next, the resulting polymer was dissolved in 430 ml of chloroform and contacted with 720 ml of aqueous 1 N HCl. The chloroform solution containing the polymer formed was poured into 1500 ml of isopropyl alcohol, thereby precipitating the polymer therein, and this was filtered under suction. This treatment was repeated twice. The resulting residue was stirred in 600 ml of isopropyl alcohol, and filtered under suction. This treatment was repeated until the filtrate became neutral. Then, the residue was dried with hot air at 60° C. to obtain 59.3 g (yield: 82.4%) of an aliphatic polyester polymer (polylactic acid).

The physical properties of the polymer are mentioned below.

Weight-average molecular weight: 130,000.

Differential calorimetry: The glass transition point was 57.9° C., and the melting point was 158.4° C.

Tensile strength: 620 kg/cm$^2$ (at break).

Haze: <1%.

Degradability: Films of the polymer were degraded to such a degree that their strength could not be measured.

Example C'-6

102.3 g of 88% L-lactic acid and 0.80 g of paratoluene-sulfonic acid monohydrate were fed into a 500 ml round-bottom flask. Then, the system was heated from room temperature up to 160° C. over a period of 1 hour in a nitrogen atmosphere under normal pressure, and kept at 160° C. for 1 hour, and the normal pressure of the system was gradually lowered to 10 mmHg over a period of 2 hours still at 160° C. Finally, the reaction was continued at 160° C./10 mmHg for 6 hours. The prepolymer formed in this stage had a molecular weight of 8,200.

After this, the reaction liquid was poured into an enamel vat, and cooled to 30° C. Then, the resulting prepolymer was ground in a mortar to be granular.

The prepolymer was put into a U-shaped glass tube, and heated at 140° C. in a nitrogen atmosphere for 40 hours. The polymer thus formed is dissolved in 430 ml of chloroform and then contacted with 430 ml of water to remove the catalyst. The chloroform solution of the polymer was poured into 1500 ml of isopropyl alcohol, thereby precipitating the polymer therein. The residue was collected through filtration under suction, and dried with hot air at 60° C. to obtain 56.4 g (yield: 78.3%) of an aliphatic polyester polymer (polylactic acid).

The physical properties of the polymer are mentioned below.

Weight-average molecular weight: 135,000.

Differential calorimetry: The glass transition point was 58.8° C., and the melting point was 163.8° C.

Tensile strength: 520 kg/cm$^2$ (at break).

Haze: <1%.

Degradability: Films of the polymer were degraded to such a degree that their strength could not be measured.

Comparative Example C'-1

102.3 g of 88% L-lactic acid was fed into a 500 ml round-bottom flask. Then, the system was heated from room temperature up to 180° C. over a period of 1.5 hours in a nitrogen atmosphere, and stirred under heat at 180° C. in the nitrogen atmosphere for 0.5 hours with water formed being removed out of the system through vaporization. Next, a Dean Stark trap charged with 72 g of o-dichlorobenzene was attached to the flask, 7.2 g of o-dichlorobenzene was added to the reaction mass, and the system was subjected to azeotropic dehydration at 180° C. in the nitrogen atmosphere for 6 hours. Then, the Dean Stark trap was detached, and a duct filled with 30 g of Molecular Sieve 3A, to which had been added 54 g of o-dichlorobenzene having a water content of at most 10 ppm, was attached to the flask in such a manner that the solvent being refluxed in the flask could run through the molecular sieve-charged duct and could be recirculated into the flask. In that condition, 10 g of o-dichlorobenzene was added to the reaction mass, and the system was further stirred under heat at 180° C. in the nitrogen atmosphere for 13 hours with water formed being prevented from entering the system. The prepolymer formed in this stage had a molecular weight of 9,500.

After this, the reaction liquid was cooled to 30° C. thereby precipitating the prepolymer therein, and o-dichlorobenzene was removed through vaporization at 60° C./10 mmHg. Then, the resulting prepolymer was dried in a nitrogen atmosphere to be powdery.

The thus-obtained prepolymer was put into a U-shaped glass tube, and heated at 140° C. in a nitrogen atmosphere for 65 hours obtain 65.2 g (yield: 90.6%) of an aliphatic polyester polymer (polylactic acid).

The physical properties of the polymer are mentioned below.

Weight-average molecular weight: 23,000.

Differential calorimetry: The glass transition point was 49.0° C., and the melting point was 154.1° C.

Tensile strength: As being too brittle, the tensile strength could not be measured.

Haze: <1%.

Degradability: Films of the polymer were degraded to such a degree that their strength could not be measured.

Part D, Production of Prepolymers and Crystallization of Solid-Phase Polymerization and Solid-Polymerization Prepolymer Production Example 1

400 g of 90% L-lactic acid (D-form content: 0.40%) and 0.28 g of metal tin powder were fed into a 500 ml, four-neck glass flask, then purged with nitrogen, and thereafter heated from room temperature up to 160° C. under a reduced pressure of 80 mmHg. At about 60° C., water formed in the reaction began to vaporize out, and this stage was for the starting time of 0 hour. Within a period of 1 hour from the starting time, the reaction system was heated up to 160° C. In this stage, the weight-average molecular weight of the reaction product was at most 500. After having reached 160° C., the reaction system was kept as it was for further one hour under the settled reduced pressure of 80 mmHg. Next, the degree of the reduced pressure was varied from 80 mmHg to 10 mmHg over a period of 30 minutes still at 160° C., and thereafter the reaction system was kept under the varied condition for 8 hours. After the total of 10 hours and 30 minutes in this process, the weight of the polymer formed was 264 g (yield: 91.7%), the weight-average molecular weight (Mw) thereof was 15000.

Prepolymer Production Example 2

The same process as in Prepolymer Production Example 1 was repeated, except that 1.91 g of paratoluenesulfonic acid monohydrate was used in place of metal tin powder as the catalyst.

The prepolymer obtained after 10 hours and 30 minutes weighed 265 g (yield: 92.0%), and had Mw of 16,000 and a D-form content of 1.33%.

Prepolymer Production Example 3

The same process as in Prepolymer Production Example 1 was repeated, except that 1.58 g of methanesulfonic acid was used in place of metal tin powder as the catalyst.

The prepolymer obtained after 10 hours and 30 minutes weighed 265 g (yield: 92.0%), and had Mw of 15,000 and a D-for m content of 1.31%.

Prepolymer Production Example 4

400 g of 90% L-lactic acid (D-form content: 0.40%) and 0.28 g of metal tin powder were fed into a 500 ml, four-neck glass flask, then purged with nitrogen, and thereafter heated from room temperature up to 160° C. under a reduced pressure of 80 mmHg. At about 60° C., water formed in the reaction began to vaporize out, and this stage was for the starting time of 0 hour. Within a period of 1 hour from the starting time, the reaction system was heated up to 120° C. After having reached 120° C., the reaction system was kept as it was for further one hour under the settled reduced pressure of 80 mmHg. Next, the degree of the reduced pressure was varied from 80 mmHg to 10 mmHg over a period of 30 minutes still at 120° C., and thereafter the reaction system was kept under the varied condition for 3 hours. After the total of 5 hours and 30 minutes in this process, the weight-average molecular weight (Mw) of the product formed was 1500, and the D-form content thereof was 0.41%. Next, the reaction system was heated from 120° C. up to 160° C. over a period of 1 hour, and the dehydrating condensation was continued under the condition of 10 mmHg and 160° C. After 10 hours under the condition of 10 mmHg and 160° C., the reaction was stopped. The total reaction time was 16 hours and 30 minutes. The thus-obtained polymer (polylactic acid) weighed 273 g (yield: 94.8%)

The polymer had Mw of 13000 and a D-form content of 0.65%.

Prepolymer Production Example 5

The same process as in Prepolymer Production Example 4 was repeated, except that 1.91 g of paratoluenesulfonic acid monohydrate was used in place of metal tin powder as the catalyst.

The prepolymer obtained after 16 hours and 30 minutes weighed 273 g (yield: 94.8%), and had Mw of 16,000 and a D-form content of 0.66%.

Prepolymer Production Example 6

The same process as in Prepolymer Production Example 4 was repeated, except that 1.58 g of methanesulfonic acid was used in place of metal tin powder as the catalyst.

The prepolymer obtained after 16 hours and 30 minutes weighed 272 g (yield: 94.4%), and had Mw of 15,000 and a D-form content of 0.69%.

Prepolymer Crystallization Example 1

Each prepolymer of Prepolymer Production Examples 1 to 6 was ground in a mortar and sieved to obtain prepolymer particles having a particle size of from 2.36 to 2.80 mm.

20 g of the particles of each prepolymer were put into 80 g of water at 50° C., and left as they were for 60 minutes for crystallization. Being in water, the prepolymer particles were neither fused together nor broken at all.

Those crystallized prepolymers are referred to as Crystallized Prepolymer 1 to Crystallized Prepolymer 6.

Prepolymer Crystallization Example 2

Each prepolymer of Prepolymer Production Examples 1 to 6 was ground in a mortar and sieved to obtain prepolymer particles having a particle size of from 2.36 to 2.80 mm.

20 g of the particles of each prepolymer were kept in an oven at 80° C. for crystallization. In the oven, the prepolymer particles fused together.

Those crystallized prepolymers are referred to as Crystallized Prepolymer 7 to Crystallized Prepolymer 12.

Examples of Solid-Phase Polymerization

Example D-1

5.00 g of Crystallized Prepolymer 1 was weighed and put into a vertical SUS reactor, and subjected to solid-phase polymerization for 60 hours in a constant-temperature air drier (oven) at 140° C. with nitrogen gas flowing in the drier at a nitrogen flow rate of 200 ml/min. Thus was obtained 4.46 g (yield: 89.2%) of polylactic acid. In this stage, the residual catalyst concentration (tin concentration) in the polylactic acid, $C_A$, was 1200 ppm. Since the catalyst concentration (tin concentration), $C_B$, is 1200 ppm, the residual percentage of the catalyst, R, is 100%.

This polylactic acid was dissolved in 27 ml of chloroform, and contacted with 45 ml of aqueous 1 N HCl, and the resulting chloroform solution of polylactic acid was poured into 100 ml of isopropyl alcohol, thereby precipitating the polymer, and filtered under suction. This treatment was repeated twice. The resulting residue was stirred in 40 ml of isopropyl alcohol, and then filtered under suction. This treatment was repeated until the filtrate became neutral. The residue was dried with hot air at 60° C. to obtain 3.52 g (yield: 70.4%) of polylactic acid.

The dew point of the nitrogen gas used herein was −60° C.

The characteristics of the aliphatic polyester as obtained after the solid-phase polymerization are as follows:

The catalyst concentration (tin concentration) was determined through fluorescent X-ray analysis.

Weight-average molecular weight (Mw)=122,000.

Differential calorimetry: The glass transition point was 57.7° C., and the melting point was 165.3° C.

Tensile strength: 570 kg/cm$^2$ (at break).

Tensile elongation: 7%.

Haze: <1%.

Yellowness (YI value): 4.2

D-form content: 1.40%.

Catalyst concentration after the treatment for catalyst removal: 10 ppm.

Molecular weight retentiveness in pressing: 95%.

Degradability: Films of the polymer were degraded to such a degree that their strength could not be measured.

Example D-2

5.00 g of Crystallized Prepolymer 2 was weighed and put into a vertical SUS reactor, and subjected to solid-phase polymerization in an air drier under the following reaction condition:

(1) in flowing nitrogen gas (nitrogen flow rate: 50 ml/min) at 140° C. for 20 hours, (2) in flowing nitrogen gas (nitrogen flow rate: 25 ml/min) at 160° C. for 40 hours, and (3) in flowing nitrogen gas (nitrogen flow rate: 200 ml/min) at 160° C. for 20 hours.

Thus was obtained 4.63 g (yield: 92.6%) of polylactic acid.

The dew point of the nitrogen gas used herein was −60° C.

The characteristics of the aliphatic polyester as obtained after the solid-phase polymerization are as follows:

Weight-average molecular weight (Mw)=130,000.

Differential calorimetry: The glass transition point was 58.1° C., and the melting point was 166.3° C.

Tensile strength: 580 kg/cm² (at break).

Tensile elongation: 7%.

Haze: <1%.

Yellowness (YI value): 7.5

D-form content: 1.51%.

Catalyst concentration, $C_A$: 646 ppm (sulfur content: 120 ppm).

Catalyst concentration, $C_B$: 7060 ppm.

Residual percentage of catalyst, R: 9.2%.

Molecular weight retentiveness in pressing: 94%.

Degradability: Films of the polymer were degraded to such a degree that their strength could not be measured.

Example D-3

5.00 g of Crystallized Prepolymer 3 was weighed and put into a vertical SUS reactor, and subjected to solid-phase polymerization in an air drier under the following reaction condition:

(1) in flowing nitrogen gas (nitrogen flow rate: 5 ml/min) at 140° C. for 20 hours, (2) in flowing nitrogen gas (nitrogen flow rate: 2.5 ml/min) at 160° C. for 40 hours, and (3) in flowing nitrogen gas (nitrogen flow rate: 50 ml/min) at 160° C. for 20 hours.

Thus was obtained 4.59 g (yield: 91.8%) of polylactic acid.

The dew point of the nitrogen gas used herein was −60° C.

The characteristics of the aliphatic polyester as obtained after the solid-phase polymerization are as follows:

Weight-average molecular weight (Mw)=132,000.

Differential calorimetry: The glass transition point was 58.4° C., and the melting point was 166.7° C.

Tensile strength: 580 kg/cm² (at break).

Tensile elongation: 8%.

Haze: <1%.

Yellowness (YI value): 5.0

D-form content: 1.49%.

Catalyst concentration, $C_A$: 450 ppm (sulfur content: 150 ppm).

Catalyst concentration, $C_B$: 6500 ppm.

Residual percentage of catalyst, R: 6.9%.

Molecular weight retentiveness in pressing: 93%.

Degradability: Films of the polymer were degraded to such a degree that their strength could not be measured.

Example D-4

5.00 g of Crystallized Prepolymer 4 was weighed and put into a vertical SUS reactor, and subjected to solid-phase polymerization for 60 hours in a constant-temperature air drier (oven) at 140° C. with nitrogen gas flowing in the drier at a nitrogen flow rate of 200 ml/min. Thus was obtained 4.50 g (yield: 90.0%) of polylactic acid. In this stage, the residual catalyst concentration (tin concentration) in the polylactic acid, $C_A$, was 1100 ppm. Since the catalyst concentration (tin concentration), $C_B$, is 1100 ppm, the residual percentage of the catalyst, R, is 100%.

This polylactic acid was dissolved in 27 ml of chloroform, and contacted with 45 ml of aqueous 1 N HCl, and the resulting chloroform solution of polylactic acid was poured into 100 ml of isopropyl alcohol, thereby precipitating the polymer, and filtered under suction. This treatment was repeated twice. The resulting residue was stirred in 40 ml of isopropyl alcohol, and then filtered under suction. This treatment was repeated until the filtrate became neutral. The residue was dried with hot air at 60° C. to obtain 3.53 g (yield: 70.6%) of polylactic acid.

The dew point of the nitrogen gas used herein was −60° C.

The characteristics of the aliphatic polyester as obtained after the solid-phase polymerization are as follows:

The catalyst concentration (tin concentration) was determined through fluorescent X-ray analysis.

Weight-average molecular weight (Mw)=122,000.

Differential calorimetry: The glass transition point was 57.5° C., and the melting point was 165.3° C.

Tensile strength: 570 kg/cm² (at break).

Tensile elongation: 7%.

Haze: <1%.

Yellowness (YI value): 4.0

D-form content: 0.82%.

Catalyst concentration (tin concentration) after the treatment for catalyst removal: 12 ppm.

Molecular weight retentiveness in pressing: 95%.

Degradability: Films of the polymer were degraded to such a degree that their strength could not be measured.

Example D-5

5.00 g of Crystallized Prepolymer 5 was weighed and put into a vertical SUS reactor, and subjected to solid-phase polymerization in an air drier under the following reaction condition:

(1) in flowing nitrogen gas (nitrogen flow rate: 50 ml/min) at 140° C. for 20 hours, (2) in flowing nitrogen gas (nitrogen flow rate: 25 ml/min) at 160° C. for 40 hours, and (3) in flowing nitrogen gas (nitrogen flow rate: 200 ml/min) at 160° C. for 20 hours.

Thus was obtained 4.61 g (yield: 92.2%) of polylactic acid.

The dew point of the nitrogen gas used herein was −60° C.

The characteristics of the aliphatic polyester as obtained after the solid-phase polymerization are as follows:

Weight-average molecular weight (Mw)=128,000.

Differential calorimetry: The glass transition point was 58.0° C., and the melting point was 166.0° C.

Tensile strength: 570 kg/cm² (at break).

Tensile elongation: 8%.

Haze: <1%.

Yellowness (YI value): 7.0

D-form content: 0.82%.

Catalyst concentration, $C_A$: 646 ppm (sulfur content: 120 ppm).

Catalyst concentration, $C_B$: 6870 ppm.

Residual percentage of catalyst, R: 9.4%.

Molecular weight retentiveness in pressing: 93%.

Degradability: Films of the polymer were degraded to such a degree that their strength could not be measured.

Example D-6

5.00 g of Crystallized Prepolymer 6 was weighed and put into a vertical SUS reactor, and subjected to solid-phase polymerization in an air drier under the following reaction condition:

(1) in flowing nitrogen gas (nitrogen flow rate: 5 ml/min) at 140° C. for 20 hours, (2) in flowing nitrogen gas (nitrogen flow rate: 2.5 ml/min) at 160° C. for 40 hours, and (3) in flowing nitrogen gas (nitrogen flow rate: 50 ml/min) at 160° C. for 20 hours.

Thus was obtained 4.60 g (yield: 92.0%) of polylactic acid.

The dew point of the nitrogen gas used herein was −60° C.

The characteristics of the aliphatic polyester as obtained after the solid-phase polymerization are as follows:

Weight-average molecular weight (Mw)=130,000.

Differential calorimetry: The glass transition point was 58.0° C., and the melting point was 166.3° C.

Tensile strength: 580 kg/cm$^2$ (at break).

Tensile elongation: 8%.

Haze: <1%.

Yellowness (YI value): 4.5

D-form content: 0.87%.

Catalyst concentration, $C_A$: 450 ppm (sulfur content: 150 ppm).

Catalyst concentration, $C_B$: 6320 ppm.

Residual percentage of catalyst, R: 7.1%.

Molecular weight retentiveness in pressing: 93%.

Degradability: Films of the polymer were degraded to such a degree that their strength could not be measured.

Example D-7

5.00 g of Crystallized Prepolymer 7 was weighed and put into a vertical SUS reactor, and subjected to solid-phase polymerization for 60 hours in a constant-temperature air drier (oven) at 140° C. with nitrogen gas flowing in the drier at a nitrogen flow rate of 200 ml/min. Thus was obtained 4.47 g (yield: 89.4%) of polylactic acid. In this stage, the residual catalyst concentration (tin concentration) in the polylactic acid, $C_A$, was 1200 ppm. Since the catalyst concentration (tin concentration), $C_B$, is 1200 ppm, the residual percentage of the catalyst, R, is 100%.

This polylactic acid was dissolved in 27 ml of chloroform, and contacted with 45 ml of aqueous 1 N HCl, and the resulting chloroform solution of polylactic acid was poured into 100 ml of isopropyl alcohol, thereby precipitating the polymer, and filtered under suction. This treatment was repeated twice. The resulting residue was stirred in 40 ml of isopropyl alcohol, and then filtered under suction. This treatment was repeated until the filtrate became neutral. The residue was dried with hot air at 60° C. to obtain 3.67 g (yield: 73.4%) of polylactic acid.

The dew point of the nitrogen gas used herein was −60° C.

The characteristics of the aliphatic polyester as obtained after the solid-phase polymerization are as follows:

The catalyst concentration (tin concentration) was determined through fluorescent X-ray analysis.

Weight-average molecular weight (Mw)=125,000.

Differential calorimetry: The glass transition point was 57.6° C., and the melting point was 165.8° C.

Tensile strength: 570 kg/cm$^2$ (at break)

Tensile elongation: 7%.

Haze: <1%.

Yellowness (YI value): 6.0

D-form content: 1.40%.

Catalyst concentration after the treatment for catalyst removal: 10 ppm.

Molecular weight retentiveness in pressing: 95%.

Degradability: Films of the polymer were degraded to such a degree that their strength could not be measured.

Example D-8

5.00 g of Crystallized Prepolymer 8 was weighed and put into a vertical SUS reactor, and subjected to solid-phase polymerization in an air drier under the following reaction condition:

(1) in flowing nitrogen gas (nitrogen flow rate: 50 ml/min) at 140° C. for 20 hours, (2) in flowing nitrogen gas (nitrogen flow rate: 25 ml/min) at 160° C. for 40 hours, and (3) in flowing nitrogen gas (nitrogen flow rate: 200 ml/min) at 160° C. for 20 hours.

Thus was obtained 4.75 g (yield: 95.0%) of polylactic acid.

The dew point of the nitrogen gas used herein was −60° C.

The characteristics of the polyester as obtained after the solid-phase polymerization are as follows:

Weight-average molecular weight (Mw)=131,000.

Differential calorimetry: The glass transition point was 58.1° C., and the melting point was 166.5° C.

Tensile strength: 580 kg/cm$^2$ (at break).

Tensile elongation: 7%.

Haze: <1%.

Yellowness (YI value): 12

D-form content: 1.50%.

Catalyst concentration, $C_A$: 700 ppm (sulfur content: 130 ppm).

Catalyst concentration, $C_B$: 6870 ppm.

Residual percentage of catalyst, R: 10.2%

Molecular weight retentiveness in pressing: 94%.

Degradability: Films of the polymer were degraded to such a degree that their strength could not be measured.

Example D-9

5.00 g of Crystallized Prepolymer 9 was weighed and put into a vertical SUS reactor, and subjected to solid-phase polymerization in an air drier under the following reaction condition:

(1) in flowing nitrogen gas (nitrogen flow rate: 5 ml/min) at 140° C. for 20 hours, (2) in flowing nitrogen gas (nitrogen flow rate: 2.5 ml/min) at 160° C. for 40 hours, and (3) in flowing nitrogen gas (nitrogen flow rate: 50 ml/min) at 160° C. for 20 hours.

Thus was obtained 4.70 g (yield: 94.0%) of polylactic acid.

The dew point of the nitrogen gas used herein was −60° C.

The characteristics of the aliphatic polyester as obtained after the solid-phase polymerization are as follows:

Weight-average molecular weight (Mw)=126,000.

Differential calorimetry: The glass transition point was 57.7° C., and the melting point was 165.9° C.

Tensile strength: 570 kg/cm$^2$ (at break).

Tensile elongation: 7%.

Haze: <1%.

Yellowness (YI value): 11

D-form content: 1.48%.

Catalyst concentration, $C_A$: 480 ppm (sulfur content: 160 ppm).

Catalyst concentration, $C_B$: 6350 ppm.

Residual percentage of catalyst, R: 7.6%.

Molecular weight retentiveness in pressing: 93%.

Degradability: Films of the polymer were degraded to such a degree that their strength could not be measured.

Example D-10

5.00 g of Crystallized Prepolymer 10 was weighed and put into a vertical SUS reactor, and subjected to solid-phase polymerization for 60 hours in a constant-temperature air drier (oven) at 140° C. with nitrogen gas flowing in the drier at a nitrogen flow rate of 200 ml/min. Thus was obtained 4.46 g (yield: 89.2%) of polylactic acid. In this stage, the residual catalyst concentration (tin concentration) in the polylactic acid, $C_A$, was 1100 ppm. Since the catalyst concentration (tin concentration), $C_B$, is 1100 ppm, the residual percentage of the catalyst, R, is 100%.

This polylactic acid was dissolved in 27 ml of chloroform, and contacted with 45 ml of aqueous 1 N HCl, and the resulting chloroform solution of polylactic acid was poured into 100 ml of isopropyl alcohol, thereby precipitating the polymer, and filtered under suction. This treatment was repeated twice. The resulting residue was stirred in 40 ml of isopropyl alcohol, and then filtered under suction. This treatment was repeated until the filtrate became neutral. The residue was dried with hot air at 60° C. to obtain 3.80 g (yield: 76.0%) of polylactic acid.

The dew point of the nitrogen gas used herein was −60° C.

The characteristics of the aliphatic polyester as obtained after the solid-phase polymerization are as follows:

The catalyst concentration (tin concentration) was determined through fluorescent X-ray analysis.

Weight-average molecular weight (Mw)=124,000.

Differential calorimetry: The glass transition point was 57.5° C., and the melting point was 165.7° C.

Tensile strength: 570 kg/cm² (at break).

Tensile elongation: 7%.

Haze: <1%.

Yellowness (YI value): 5.8

D-form content: 0.82%.

Catalyst concentration after the treatment for catalyst removal: 15 ppm.

Molecular weight retentiveness in pressing: 94%.

Degradability: Films of the polymer were degraded to such a degree that their strength could not be measured.

Example D-11

5.00 g of Crystallized Prepolymer 11 was weighed and put into a vertical SUS reactor, and subjected to solid-phase polymerization in an air drier under the following reaction condition:

(1) in flowing nitrogen gas (nitrogen flow rate: 50 ml/min) at 140° C. for 20 hours, (2) in flowing nitrogen gas (nitrogen flow rate: 25 ml/min) at 160° C. for 40 hours, and (3) in flowing nitrogen gas (nitrogen flow rate: 200 ml/min) at 160° C. for 20 hours.

Thus was obtained 4.73 g (yield: 94.6%) of polylactic acid.

The dew point of the nitrogen gas used herein was −60° C.

The characteristics of the aliphatic polyester as obtained after the solid-phase polymerization are as follows:

Weight-average molecular weight (Mw)=132,000.

Differential calorimetry: The glass transition point was 58.2° C., and the melting point was 166.7° C.

Tensile strength: 580 kg/cm² (at break).

Tensile elongation: 8%

Haze: <1%.

Yellowness (YI value): 11

D-form content: 0.83%.

Catalyst concentration, $C_A$: 700 ppm (sulfur content: 130 ppm).

Catalyst concentration, $C_B$: 6710 ppm.

Residual percentage of catalyst, R: 10.4%.

Molecular weight retentiveness in pressing: 94%.

Degradability: Films of the polymer were degraded to such a degree that their strength could not be measured.

Example D-12

5.00 g of Crystallized Prepolymer 12 was weighed and put into a vertical SUS reactor, and subjected to solid-phase polymerization in an air drier under the following reaction condition:

(1) in flowing nitrogen gas (nitrogen flow rate: 5 ml/min) at 140° C. for 20 hours, (2) in flowing nitrogen gas (nitrogen flow rate: 2.5 ml/min) at 160° C. for 40 hours, and (3) in flowing nitrogen gas (nitrogen flow rate: 50 ml/min) at 160° C. for 20 hours.

Thus was obtained 4.72 g (yield: 94.4%) of polylactic acid.

The dew point of the nitrogen gas used herein was −60° C.

The characteristics of the aliphatic polyester as obtained after the solid-phase polymerization are as follows:

Weight-average molecular weight (Mw)=125,000.

Differential calorimetry: The glass transition point was 57.6° C., and the melting point was 165.8° C.

Tensile strength: 570 kg/cm² (at break).

Tensile elongation: 7%.

Haze: <1%.

Yellowness (YI value): 10

D-form content: 0.85%.

Catalyst concentration, $C_A$: 420 ppm (sulfur content: 140 ppm).

Catalyst concentration, $C_B$: 6150 ppm.

Residual percentage of catalyst, R: 6.8%.

Molecular weight retentiveness in pressing: 93%.

Degradability: Films of the polymer were degraded to such a degree that their strength could not be measured.

Comparative Example D-1

102.3 g of 88% L-lactic acid was fed into a 500 ml round-bottom flask. Then, the system was heated from room temperature up to 180° C. over a period of 1.5 hours in a nitrogen atmosphere, and stirred under heat at 180° C. in the nitrogen atmosphere for 0.5 hours with water formed being removed out of the system through vaporization. Next, a Dean Stark trap charged with 72 g of o-dichlorobenzene was attached to the flask, 7.2 g of o-dichlorobenzene was added to the reaction mass, and the system was subjected to azeotropic dehydration at 180° C. in the nitrogen atmosphere for 6 hours. Then, the Dean Stark trap was detached, and a duct filled with 30 g of Molecular Sieve 3A, to which had been added 54 g of o-dichlorobenzene having a water content of at most 10 ppm, was attached to the flask in such a manner that the solvent being refluxed in the flask could run through the molecular sieve-charged duct and could be recirculated into the flask. In that condition, 10 g of o-dichlorobenzene was added to the reaction mass, and the system was further stirred under heat at 180° C. in the nitrogen atmosphere for 13 hours with water formed being prevented from entering the system. The prepolymer formed in this stage had a molecular weight of 9,500.

After this, the reaction liquid was cooled to 30° C. thereby precipitating the prepolymer therein, and o-dichlorobenzene was removed through vaporization at 60° C./10 mmHg. Then, the resulting prepolymer was dried in a nitrogen atmosphere to be powdery.

The thus-obtained prepolymer was put into a U-shaped glass tube, and heated at 140° C. in a nitrogen atmosphere for 65 hours obtain 65.2 g (yield: 90.6%) of an aliphatic polyester polymer (polylactic acid).

The physical properties of the polymer are mentioned below.

Weight-average molecular weight: 23,000.

Differential calorimetry: The glass transition point was 49.0° C., and the melting point was 154.1° C.

Tensile strength: As being too brittle, the tensile strength could not be measured.

Haze: <1%.

Degradability: Films of the polymer were degraded to such a degree that their strength could not be measured.

Part E, Solid-Phase Polymerization of star polymers:

Example E-1

102.3 g of 88% L-lactic acid and 0.78 g of paratoluenesulfonic acid monohydrate were fed into a 500 ml round-bottom flask, and purged with nitrogen. Then, the system was heated from room temperature up to 160° C. over a period of 1 hour, and kept at 160° C. for 1 hour, and the normal pressure of the system was gradually lowered to 10 mmHg over a period of 2 hours still at 160° C. Finally, the reaction was continued at 160° C./10 mmHg for 4 hours. The prepolymer formed in this stage had a molecular weight of 15,000.

Next, 18 g of polybutylene succinate (molecular weight: 40,000) was added to the reaction mass, and reacted for further 3 hours at 160° C./10 mmHg. In this stage, the prepolymer still had a molecular weight of 15,000.

Next, the reaction liquid was poured into an enamel vat, and cooled to 30° C. Then, the resulting prepolymer was ground in a mortar to be granular.

The prepolymer was put into a U-shaped glass tube, and heated at 80° C. for 1 hour in an nitrogen stream (flow rate: 50 ml/min) for crystallization. This was further heated at 120° C. in nitrogen (flow rate: 50 ml/min) for 20 hours, at 140° C. in nitrogen (flow rate: 50ml/min) for 150 hours, and then 150° C. in nitrogen (flow rate: 200 ml/min) for 20 hours. Thus was obtained 82.8 g (yield: 92.0%) of an aliphatic polyester.

The physical properties of the thus-obtained aliphatic polyester are mentioned below.

Weight-average molecular weight: 104,000.

Differential calorimetry: The glass transition point was 25.7° C., and the melting point was 148.4° C.

Tensile strength: 300 kg/cm$^2$ (at yield), 320 kg/cm$^2$ (at break).

Tensile elongation: 260%.

Haze: <1%.

Yellowness (YI value): 11

Degradability: Films of the polymer were degraded to such a degree that their strength could not be measured.

Example E-2

102.3g of 88% L-lactic acid, 0.136g of pentaerythritol, 0.236 g of succinic acid and 0.78 g of paratoluenesulfonic acid monohydrate were fed into a 500 ml round-bottom flask, and purged with nitrogen. Then, the system was heated from room temperature up to 160° C. over a period of 1 hour, and kept at 160° C. for 1 hour, and the normal pressure of the system was gradually lowered to 10 mmHg over a period of 2 hours still at 160° C. Finally, the reaction was continued at 160° C./10 mmHg for 8 hours. The prepolymer formed in this stage had a molecular weight of 18,000.

Next, the reaction liquid was poured into an enamel vat, and cooled to 30° C. Then, the resulting prepolymer was ground in a mortar to be granular.

The prepolymer was put into a U-shaped glass tube, and heated at 80° C. for 1 hour in an nitrogen stream (flow rate: 60 ml/min) for crystallization. This was further heated at 140° C. in nitrogen (flow rate: 60 ml/min) for 20 hours and then at 160° C. in nitrogen (flow rate: 2400 ml/min) for 40 hours. Thus was obtained 66.5 g (yield: 92.3%) of an aliphatic polyester.

The physical properties of the thus-obtained aliphatic polyester are mentioned below.

Weight-average molecular weight: 481,000.

Differential calorimetry: The glass transition point was 59.8° C., and the melting point was 172.8° C.

Tensile strength: 620 kg/cm$^2$ (at break).

Tensile elongation: 8%.

Flexural strength: 830 kg/cm$^2$.

Haze: 3.5%.

Yellowness (YI value): 2.7.

The temperature at which the melt flow index (MI) of the aliphatic polyester is 10 g/10 min, the melt tension (MT) of the aliphatic polyester at that temperature, and the degradability of the aliphatic polyester are mentioned below.

Temperature (MI: 10 g/10 min): 200° C.

Melt tension (MT): 3.2 g.

Degradability: Films of the aliphatic polyester were degraded to such a degree that their strength could not be measured.

Example E-3

102.3 g of 88% L-lactic acid, 0.0136 g of pentaerythritol, 0.0236 g of succinic acid and 0.78 g of paratoluenesulfonic acid monohydrate were fed into a 500 ml round-bottom flask, and purged with nitrogen. Then, the system was heated from room temperature up to 160° C. over a period of 1 hour, and kept at 160° C. for 1 hour, and the normal pressure of the system was gradually lowered to 10 mmHg over a period of 2 hours still at 160° C. Finally, the reaction was continued at 160° C./10 mmHg for 8 hours. The prepolymer formed in this stage had a molecular weight of 14,000.

Next, the reaction liquid was poured into an enamel vat, and cooled to 30° C. Then, the resulting prepolymer was ground in a mortar to be granular.

The prepolymer was put into a U-shaped glass tube, and heated at 80° C. for 1 hour in an nitrogen stream (flow rate: 60 ml/min) for crystallization. This was further heated at 140° C. in nitrogen (flow rate: 60 ml/min) for 20 hours and then at 160° C. in nitrogen (flow rate: 2400 ml/min) for 40 hours. Thus was obtained 66.3 g (yield: 92.0%) of an aliphatic polyester.

The physical properties of the thus-obtained aliphatic polyester are mentioned below.

Weight-average molecular weight: 210,000.

Differential calorimetry: The glass transition point was 59.3° C., and the melting point was 161.8° C.

Tensile strength: 590 kg/cm² (at break).

Tensile elongation: 8%.

Flexural strength: 790 kg/cm².

Haze: 3.0%.

Yellowness (YI value): 2.1

The temperature at which the melt flow index (MI) of the aliphatic polyester is 10 g/10 min, the melt tension (MT) of the aliphatic polyester at that temperature, and the degradability of the aliphatic polyester are mentioned below.

Temperature (MI: 10 g/10 min): 200° C.

Melt tension (MT): 2.7 g.

Degradability: Films of the aliphatic polyester were degraded to such a degree that their strength could not be measured.

Example E-4

102.3 g of 88 9 L-lactic acid, 0.136 g of pentaerythritol, 0.236 g of succinic acid and 0.58 g of methanesulfonic acid were fed into a 500 ml round-bottom flask, and purged with nitrogen. Then, the system was heated from room temperature up to 160° C. over a period of 1 hour, and kept at 160° C. for 1 hour, and the normal pressure of the system was gradually lowered to 10 mmHg over a period of 2 hours still at 160° C. Finally, the reaction was continued at 160° C./10 mmHg for 8 hours. The prepolymer formed in this stage had a molecular weight of 18,000.

Next, the reaction liquid was poured into an enamel vat, and cooled to 30° C. Then, the resulting prepolymer was ground in a mortar to be granular.

The prepolymer was put into a U-shaped glass tube, and heated at 80° C. for 1 hour in an nitrogen stream (flow rate: 60 ml/min) for crystallization. This was further heated at 140° C. in nitrogen (flow rate: 20 ml/min) for 20 hours and then at 160° C. in nitrogen (flow rate: 1200 ml/min) for 40 hours. Thus was obtained 66.5 g (yield: 92.3%) of an aliphatic polyester.

The physical properties of the thus-obtained aliphatic polyester are mentioned below.

Weight-average molecular weight: 314,000.

Differential calorimetry: The glass transition point was 59.8° C., and the melting point was 172.8° C.

Tensile strength: 620 kg/cm² (at break).

Tensile elongation: 8%.

Flexural strength: 810 kg/cm².

Haze: 3.5%.

Yellowness (YI value): 2.5.

The temperature at which the melt flow index (MI) of the aliphatic polyester is 10 g/10 min, the melt tension (MT) of the polymer at that temperature, and the degradability of the aliphatic polyester are mentioned below.

Temperature (MI: 10 g/10 min): 195° C.

Melt tension (MT): 2.7 g.

Degradability: Films of the aliphatic polyester were degraded to such a degree that their strength could not be measured.

Example E-5

102.3 g of 88% L-lactic acid, 0.134 g of trimethylolpropane, 0.178 g of succinic acid and 0.78 g of paratoluenesulfonic acid monohydrate were fed into a 500 ml round-bottom flask, and purged with nitrogen. Then, the system was heated from room temperature up to 160° C. over a period of 1 hour, and kept at 160° C. for 1 hour, and the normal pressure of the system was gradually lowered to 10 mmHg over a period of 2 hours still at 160° C. Finally, the reaction was continued at 160° C./10 mmHg for 8 hours. The prepolymer formed in this stage had a molecular weight of 14,000.

Next, the reaction liquid was poured into an enamel vat, and cooled to 30° C. Then, the resulting prepolymer was ground in a mortar to be granular.

The prepolymer was put into a U-shaped glass tube, and heated at 80° C. for 1 hour in an nitrogen stream (flow rate: 60 ml/min) for crystallization. This was further heated at 140° C. in nitrogen (flow rate: 60 ml/min) for 20 hours and then at 160° C. in nitrogen (flow rate: 2400 ml/min) for 40 hours. Thus was obtained 66.5 g (yield: 92.3%) of an aliphatic polyester.

The physical properties of the thus-obtained aliphatic polyester are mentioned below.

Weight-average molecular weight: 261,000.

Differential calorimetry: The glass transition point was 59.6° C., and the melting point was 171.8° C.

Tensile strength: 600 kg/cm² (at break).

Tensile elongation: 8%.

Flexural strength: 800 kg/cm².

Haze: 3.1%.

Yellowness (YI value): 3.2.

The temperature at which the melt flow index (MI) of the aliphatic polyester is 10 g/10 min, the melt tension (MT) of the polymer at that temperature, and the degradability of the aliphatic polyester are mentioned below.

Temperature (MI: 10 g/10 min): 195° C.

Melt tension (MT): 3.0 g.

Degradability: Films of the aliphatic polyester were degraded to such a degree that their strength could not be measured.

While the invention has been described in detail and with reference to specific embodiments thereof, it will be apparent to one skilled in the art that various changes and modifications can be made therein without departing from the spirit and scope thereof.

What is claimed is:

1. A process for producing aliphatic polyesters having a weight-average molecular weight ($Mw_2$) that falls within a numerical range as defined by the following numerical formula (2) and numerical formula (3) and having at least 50% of aliphatic hydroxycarboxylic acid units, which comprises polymerizing a crystallized, aliphatic polyester prepolymer having a weight-average molecular weight ($Mw_1$) that falls within a numerical range as defined by the following numerical formula (1) and having at least 50% of aliphatic hydroxycarboxylic acid units, in a solid phase in the presence of a catalyst:

$$2 \times 10^3 \leq Mw_1 \leq 1 \times 10^5 \quad (1),$$
$$5 \times 10^4 \leq Mw_2 \leq 1 \times 10^6 \quad (2),$$
$$Mw_1 < Mw_2 \quad (3).$$

2. The process for producing aliphatic polyesters according to claim 1, wherein the crystallized, aliphatic polyester prepolymer is one as prepared by crystallizing a solid, aliphatic polyester prepolymer through contact with a liquid not dissolving said prepolymer.

3. The process for producing aliphatic polyesters according to claim 1, wherein the crystallized, aliphatic polyester prepolymer is one as prepared by solidifying and crystallizing a molten, aliphatic polyester prepolymer through contact with a liquid not dissolving said prepolymer.

4. The process for producing aliphatic polyesters according to claim 1, wherein the crystallized, aliphatic polyester prepolymer is one as prepared by solidifying and crystallizing a solution of an aliphatic polyester prepolymer as dissolved in a solvent, through contact with a liquid not dissolving said prepolymer.

5. The process for producing aliphatic polyesters according to claim 4, wherein the liquid contains water at least partially.

6. The process for producing aliphatic polyesters according to claim 1, wherein the catalyst is a volatile catalyst.

7. The process for producing aliphatic polyesters according to claim 1, wherein the catalyst is a volatile catalyst, and the residual percentage of the catalyst, R, in the product, which is defined by the following numerical formula (10), is at most 50%:

$$R[\%] = C_A[ppm] \div C_B[ppm] \times 100 \quad (10)$$

wherein R is the residual percentage of the catalyst [%], and this constitutes an index of the variation in the catalyst concentration before and after the solid-phase polymerization, $C_B$ [ppm] is the theoretical catalyst concentration in the case where all the catalyst as fed into the reaction system for solid-phase polymerization is to remain in the product, aliphatic polyester, and this is represented by the following numerical formula (11), and $C_A$ [ppm] is the actual catalyst concentration in the aliphatic polyester as finally obtained after the solid-phase polymerization, and this is represented by the following numerical formula (12):

$$C_B[ppm] = W_B[g] \div W_P[g] \times 10^6 \quad (11)$$

wherein $W_B$ [g] is the total weight of the catalyst as fed into the reaction system during the solid-phase polymerization, and $W_P$ [g] is the weight of the aliphatic polyester as finally obtained after the solid-phase polymerization, $$C_A[ppm] = W_A[g] \div W_P[g] \times 10^6 \quad (12)$$

wherein $W_A$ [g] is the weight of the catalyst remaining in the aliphatic polyester as finally obtained after the solid-phase polymerization, and $W_P$ [g] is the weight of the aliphatic polyester as finally obtained after the solid-phase polymerization.

8. The process for producing aliphatic polyesters according to claim 7, wherein the volatile catalyst is an organic sulfonic acid compound.

9. The process for producing aliphatic polyesters according to claim 8, wherein the organic sulfonic acid compound is at least one selected from the group consisting of methanesulfonic acid, ethanesulfonic acid and 1-propanesulfonic acid, benzenesulfonic acid, p-toluenesulfonic acid and p-chlorobenzenesulfonic acid.

10. The process for producing aliphatic polyesters according to claim 9, wherein the catalyst concentration in the aliphatic polyester finally obtained is from 0 to 300 ppm in terms of the sulfur content.

11. The process for producing aliphatic polyesters according to claim 1, wherein the catalyst is a nonvolatile catalyst.

12. The process for producing aliphatic polyesters according to claim 11, wherein the nonvolatile catalyst is metal tin or tin(II) oxide.

13. A process for producing aliphatic polyhydroxycarboxylic acids having a weight-average molecular weight ($Mw_2$) that falls within a numerical range as defined by the following numerical formula (2) and numerical formula (3), the process comprising;

(A) a step of preparing an aliphatic hydroxycarboxylic acid prepolymer having a weight-average molecular weight ($Mw_1$) that falls within a numerical range as defined by the following numerical formula (1), through dehydrating polycondensation of an aliphatic hydroxycarboxylic acid or its oligomer, or an aliphatic hydroxycarboxylic acid or its oligomer, an aliphatic polyol having at least 3 hydroxyl groups, an aliphatic polybasic acid having at least 2 carboxyl groups and/or an anhydride thereof, or an aliphatic hydroxycarboxylic acid or its oligomer, an aliphatic polybasic acid having at least 3 carboxyl groups and/or an anhydride thereof and an aliphatic polyol having at least 2 hydroxyl groups, in the presence or absence of a catalyst and in the presence or absence of a solvent, wherein the amount of the aliphatic polyol having at least 3 hydroxyl groups and the aliphatic polybasic acid having at least 3 carboxyl groups and/or anhydride thereof, is in the range of 0.005 to 10% by weight for the theoretical amount of polymer resulting from complete homo-polymerization of aliphatic hydroxycarboxylic acid, (B) a step of crystallizing the aliphatic hydroxycarboxylic acid prepolymer as prepared in the previous step (A), and (C) a step of dehydrating and polycondensing the aliphatic hydroxycarboxylic acid prepolymer as crystallized in the previous step (B), in a solid phase in the presence of a catalyst:

$$2 \times 10^3 \leq Mw_1 \leq 1 \times 10^5 \quad (1),$$
$$5 \times 10^4 \leq Mw_2 \leq 1 \times 10^6 \quad (2),$$
$$Mw_1 < Mw_2 \quad (3).$$

14. The process for producing aliphatic polyhydroxycarboxylic acids according to claim 13, wherein the step (A) comprises;

(A-1) a step of preparing an aliphatic hydroxycarboxylic acid oligomer having a weight-average molecular weight $Mw_A$ falling within a range as defined by the following numerical formula (7), through dehydrating condensation of an aliphatic hydroxycarboxylic acid component that contains an aliphatic hydroxycarboxylic acid having an asymmetric carbon in an amount of at least 50% of the component, at a reaction temperature $RT_1$ falling within a range as defined by the following numerical formula (4), and (A-2) a step of preparing an aliphatic hydroxycarboxylic acid prepolymer having a weight-average molecular weight $Mw_B$ that falls within a range as defined by the following numerical formula (8) and numerical formula (9), through dehydrating condensation of the aliphatic hydroxycarboxylic acid oligomer as prepared in the previous step (A-1), at a reaction temperature $RT_2$ falling within a range as defined by the following numerical formula (5) and numerical formula (6):

$$50°C. \leq RT_1 \leq 140°C. \quad (4),$$

$$130°C. \leq RT_2 \leq 170°C. \quad (5),$$

$$RT_1 < RT_2 \quad (6),$$

$$750 \leq Mw_A \leq 5 \times 10^3 \quad (7),$$

$$2 \times 10^3 \leq Mw_B < 2 \times 10^4 \quad (8),$$

$$Mw_A < Mw_B \quad (9).$$

15. The process for producing aliphatic polyhydroxycarboxylic acids according to claim 13, wherein the step (A) is carried out in the presence of a catalyst.

16. The process for producing aliphatic polyhydroxycarboxylic acids according to claim 13, wherein the step (A) is carried out under reduced pressure.

17. The process for producing aliphatic polyhydroxycarboxylic acids according to claim 13, wherein the step [B] is a crystallization step to crystallize the aliphatic hydroxycarboxylic acid prepolymer by contacting it in a solid state with a liquid not dissolving said prepolymer.

18. The process for producing aliphatic polyhydroxycarboxylic acids according to claim 13, wherein the step [B] is a crystallization step to solidify and crystallize the aliphatic hydroxycarboxylic acid prepolymer by contacting it in a molten state with a liquid not dissolving said prepolymer.

19. The process for producing aliphatic polyhydroxycarboxylic acids according to claim 13, wherein the step [B] is a crystallization step to solidify and crystallize the aliphatic hydroxycarboxylic acid prepolymer by contacting a solution of the aliphatic hydroxycarboxylic acid prepolymer as dissolved in a solvent, with a liquid not dissolving said prepolymer.

20. The process for producing aliphatic polyhydroxycarboxylic acids according to any one of claims 17 to 19, wherein the liquid contains water at least partially.

21. The process for producing aliphatic polyhydroxycarboxylic acids according to claim 13, wherein the catalyst is a volatile catalyst.

22. The process for producing aliphatic polyhydroxycarboxylic acid according to claim 13, wherein the catalyst is a nonvolatile catalyst.

23. The process for producing aliphatic polyhydroxycarboxylic acids according to claim 13, wherein the catalyst is a volatile catalyst, and the residual percentage of the catalyst, R, in the product, which is defined by the following numerical formula (10), is at most 50%:

$$R[\%] = C_A[ppm] \div C_B[ppm] \times 100 \quad (10)$$

wherein R is the residual percentage of the catalyst [%], and this constitutes an index of the variation in the catalyst concentration before and after the dehydrating polycondensation, $C_B$ [ppm] is the theoretical catalyst concentration in the case where all the catalyst as fed into the reaction system for dehydration polycondensation is to remain in the product, aliphatic polyhydroxycarboxylic acid, and this is represented by the following numerical formula (11), and $C_A$ [ppm] is the actual catalyst concentration in the aliphatic polyhydroxycarboxylic acid as finally obtained after the dehydrating polycondensation, and this is represented by the following numerical formula (12):

$$C_B[ppm] = W_B[g] \div W_P[g] \times 10^6 \quad (11)$$

wherein $W_B$ [g] is the total weight of the catalyst as fed into the reaction system before and/or during the dehydrating polycondensation, and $W_P$ [g] is the weight of the aliphatic polyhydroxycarboxylic acid as finally obtained after the dehydrating polycondensation, $$C_A[ppm] = W_A[g] \div W_P[g] \times 10^6 \quad (12)$$

wherein $W_A$ [g] is the weight of the catalyst remaining in the aliphatic polyhydroxycarboxylic acid as finally obtained after the dehydrating polycondensation, and $W_P$ [g] is the weight of the aliphatic polyhydroxycarboxylic acid as finally obtained after the dehydrating polycondensation.

24. The process for producing aliphatic polyesters according to claim 1, wherein the aliphatic polyester prepolymer is polylactic acid.

25. The process for producing aliphatic polyhydroxycarboxylic acids according to claim 13 wherein the aliphatic hydroxycarboxylic acid is L-lactic acid.

26. The process for producing aliphatic polyesters according to claim 3, wherein the liquid contains water at least partially.

27. The process for producing aliphatic polyesters according to claim 2, wherein the liquid contains water at least partially.

28. The process for producing aliphatic polyesters according to claim 6, wherein the volatile catalyst is an organic sulfonic acid compound.

29. The process for producing aliphatic polyesters according to claim 28, wherein the organic sulfonic acid compound is at least one selected from the group consisting of methanesulfonic acid, ethanesulfonic acid and 1-propanesulfonic acid, benzenesulfonic acid, p-toluenesulfonic acid and p-chlorobenzenesulfonic acid.

30. The process for producing aliphatic polyesters according to claim 8, wherein the catalyst concentration in the aliphatic polyester finally obtained is from 0 to 300 ppm in terms of the sulfur content.

31. The process for producing aliphatic polyesters according to claim 29, wherein the catalyst concentration in the aliphatic polyester finally obtained is from 0 to 300 ppm in terms of the sulfur content.

32. The process for producing aliphatic polyesters according to claim 28, wherein the catalyst concentration in the aliphatic polyester finally obtained is from 0 to 300 ppm in terms of the sulfur content.

* * * * *